(12) United States Patent
Hetland et al.

(10) Patent No.: US 12,077,130 B2
(45) Date of Patent: Sep. 3, 2024

(54) ACCESSORIES FOR OFF-ROAD VEHICLES

(71) Applicant: Polaris Industries Inc., Medina, MN (US)

(72) Inventors: Jonathan M. Hetland, Lino Lakes, MN (US); Alex M. Baltes, Wayzata, MN (US); Jeremy C. Braaten, Wannaska, MN (US); Brijesh N. Pandya, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 600 days.

(21) Appl. No.: 17/217,577

(22) Filed: Mar. 30, 2021

(65) Prior Publication Data

US 2022/0314891 A1 Oct. 6, 2022

(51) Int. Cl.
| | |
|---|---|
| *B60R 5/04* | (2006.01) |
| *B62J 9/10* | (2020.01) |
| *E05D 11/08* | (2006.01) |
| *E05F 1/08* | (2006.01) |

(52) U.S. Cl.
CPC ............. *B60R 5/044* (2013.01); *B62J 9/10* (2020.02); *E05D 11/082* (2013.01); *E05F 1/08* (2013.01); *E05Y 2201/218* (2013.01); *E05Y 2201/266* (2013.01); *E05Y 2201/484* (2013.01); *E05Y 2900/518* (2013.01)

(58) Field of Classification Search
CPC .......... B60R 5/044; B60R 5/041; B60R 5/00; E05Y 2201/484; E05F 1/08
See application file for complete search history.

(56) References Cited

U.S. PATENT DOCUMENTS

| | | | |
|---|---|---|---|
| 4,221,528 A | * | 9/1980 | Gordos .................... B60R 5/00 224/310 |
| 8,596,398 B2 | | 12/2013 | Bennett |
| D722,538 S | | 2/2015 | Song |
| 8,997,908 B2 | | 4/2015 | Kinsman |
| 8,998,253 B2 | | 4/2015 | Novotny |
| 9,381,803 B2 | | 7/2016 | Galsworthy |
| 9,393,894 B2 | | 7/2016 | Steinmetz |
| 9,394,859 B2 | | 7/2016 | Parnofiello |
| 9,421,860 B2 | | 8/2016 | Schuhmacher |
| 9,440,671 B2 | | 9/2016 | Schlangen |
| 9,566,858 B2 | | 2/2017 | Hicke |
| 9,592,782 B2 | * | 3/2017 | Raska ................ B62D 33/0273 |
| 9,623,912 B2 | | 4/2017 | Schlangen |
| 9,725,023 B2 | | 8/2017 | Miller |
| 9,776,481 B2 | | 10/2017 | Deckard |
| 9,789,909 B2 | | 10/2017 | Erspamer |
| 10,179,504 B2 | * | 1/2019 | Holroyd ................ B60J 7/1642 |
| 10,315,719 B2 | | 6/2019 | Quade |

(Continued)

FOREIGN PATENT DOCUMENTS

| | | | | |
|---|---|---|---|---|
| KR | 20150091555 A | * | 8/2015 | |
| WO | 2014/075091 | | 5/2014 | |
| WO | WO-2023031172 A1 | * | 3/2023 | ............... E05D 3/02 |

*Primary Examiner* — Amy R Weisberg
*Assistant Examiner* — Maxwell L Meshaka
(74) *Attorney, Agent, or Firm* — Faegre Drinker Biddle & Reath LLP

(57) ABSTRACT

A vehicle shown herein is a side by side utility vehicle having a plurality of accessories including a cover assembly for covering an opening in a cargo area of the vehicle and a coupler for coupling various components of the vehicle.

24 Claims, 21 Drawing Sheets

(56) References Cited

U.S. PATENT DOCUMENTS

| | | | |
|---|---|---|---|
| 10,369,861 B2 | 8/2019 | Deckard | |
| 10,391,949 B2 | 8/2019 | Labbe | |
| 10,960,937 B2* | 3/2021 | Novotny | B62D 21/183 |
| 10,994,592 B2* | 5/2021 | Holroyd | B60J 7/1642 |
| 11,072,297 B2 | 7/2021 | Cooper | |
| 11,577,638 B2* | 2/2023 | Birenheide | B60P 7/15 |
| 2011/0049205 A1 | 3/2011 | Laperle | |
| 2015/0343900 A1* | 12/2015 | Schlangen | B62D 33/02 |
| | | | 180/247 |
| 2017/0334268 A1* | 11/2017 | Holroyd | B60J 7/1642 |
| 2019/0111771 A1* | 4/2019 | Holroyd | B60J 7/1642 |
| 2020/0173217 A1* | 6/2020 | Hodgson | E05F 1/16 |
| 2021/0094627 A1 | 4/2021 | Clark | |
| 2021/0178958 A1* | 6/2021 | Birenheide | B60P 7/15 |
| 2022/0314891 A1* | 10/2022 | Hetland | B60R 7/06 |

* cited by examiner

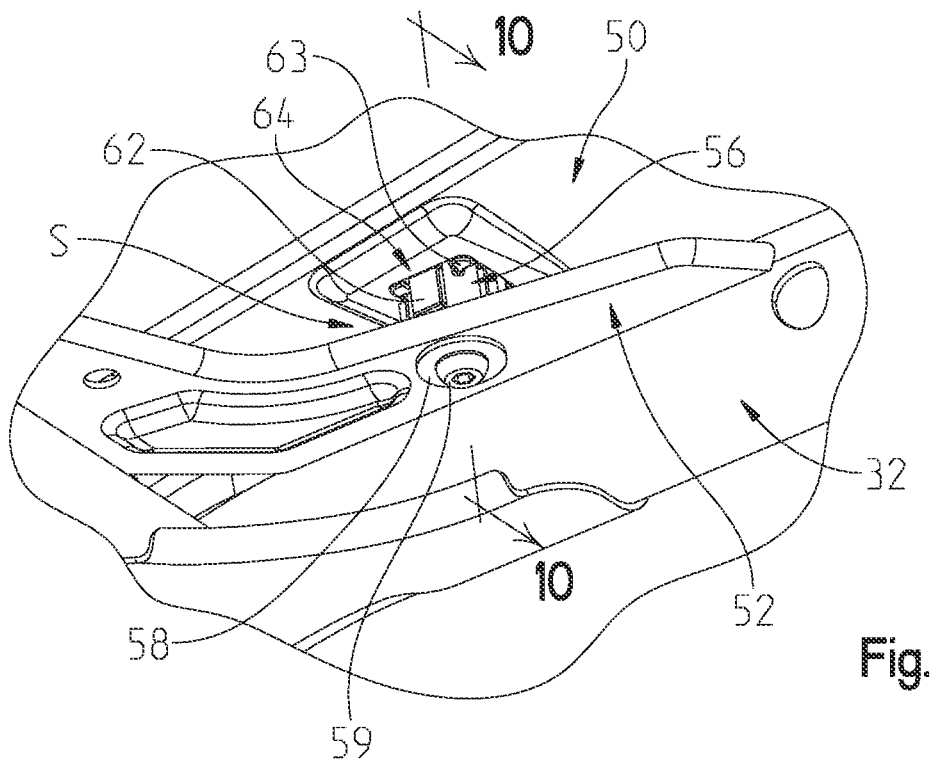
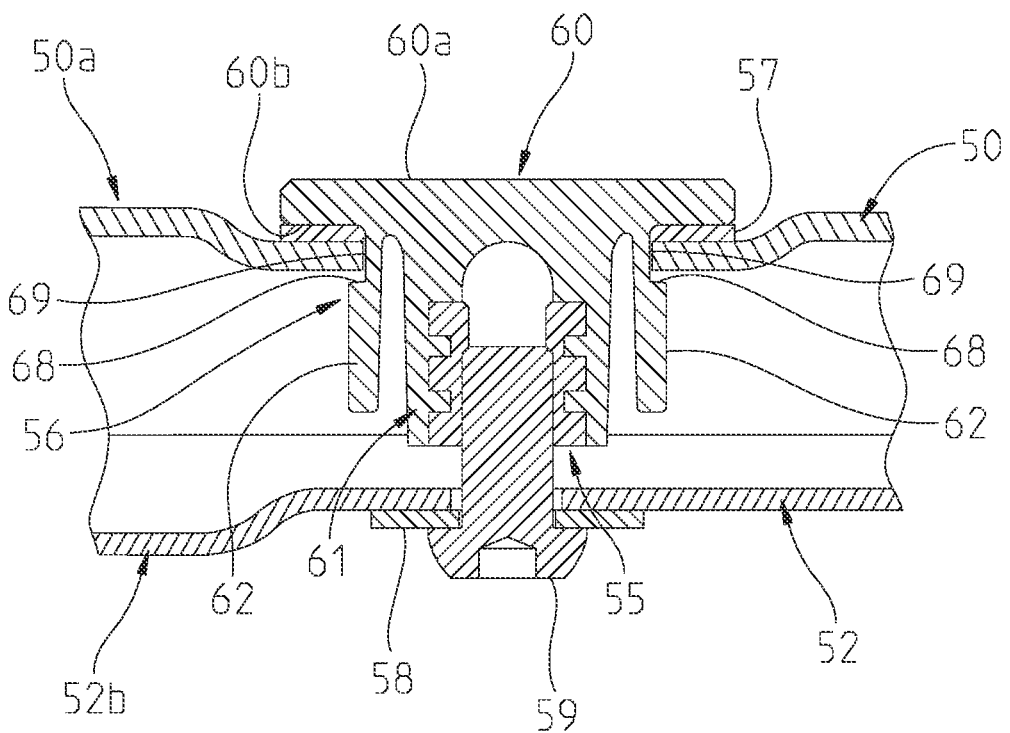
Fig. 10

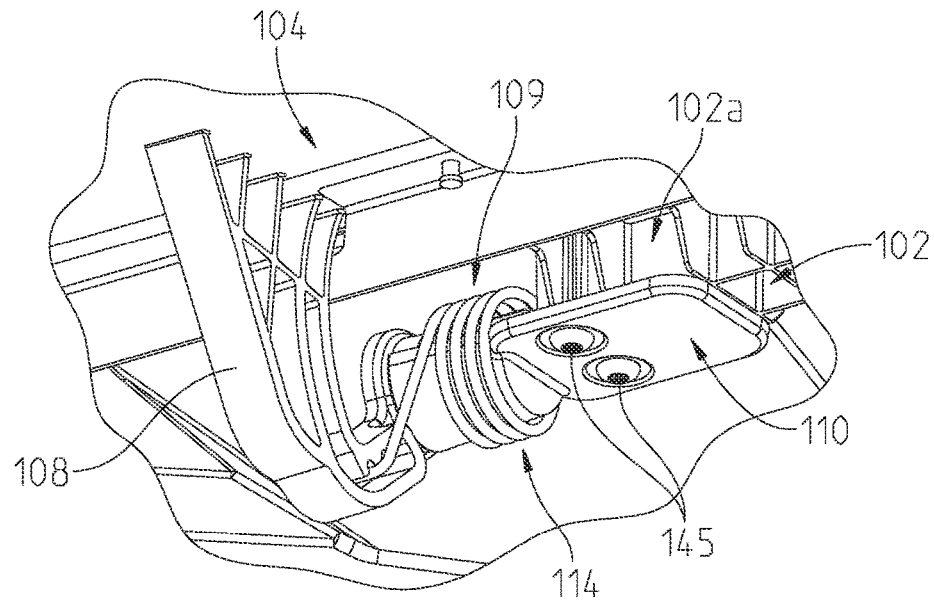
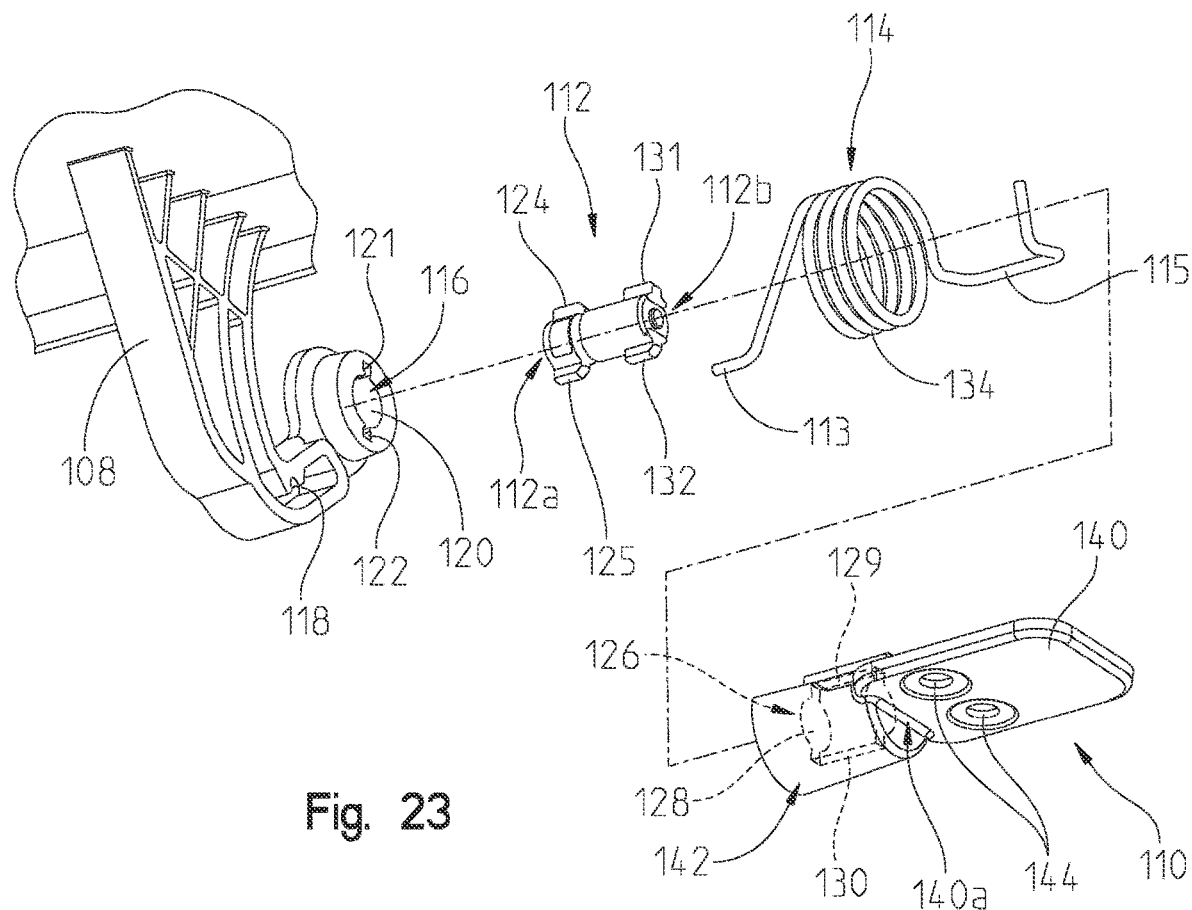
Fig. 22
Fig. 23

US 12,077,130 B2

ACCESSORIES FOR OFF-ROAD VEHICLES

FIELD OF THE INVENTION

The present invention relates to accessories for off-road vehicles including side-by-side vehicles or utility vehicles ("UTVs").

BACKGROUND OF THE INVENTION

Generally, UTVs or side-by-side vehicles are used to carry one or two passengers and a small amount of cargo over a variety of terrains. To provide additional features to the users, various accessories may be provided. To protect the passengers from tree limbs, weather, debris, and other objects, a roof may be provided. However, present couplers for coupling the roof to the frame do not provide sufficient spacing for foam provided between the roof and the frame, and therefore over-compress the foam. In addition, present couplers require a tooled exterior surface for coupling the coupler and/or roof to the UTV. Thus, a need exists for a coupler capable of providing sufficient spacing for the foam provided between the roof and the frame and a toolless exterior surface.

In addition, current UTVs do not provide side view mirrors adaptable to couple to various profiles of the UTV frame. Thus, a need exists for a side view mirror capable of coupling to various profiles of the frame of the UTV.

Furthermore, UTVs may provide a sound system. However, the speakers and amplifier of the sound system are generally provided separately, which results in a need for more space for these components. Thus, a need exists for a more compact arrangement of the speakers and amplifier for a sound system in a UTV.

In addition, a cover may be provided to enclose an opening in a cargo area of the UTV. However, current covers are only able to be held open at a fully open position or closed at a fully closed position and include latches that are independent of the cargo area. Thus, a need exists for a more robust coupling assembly for the cover.

SUMMARY OF THE INVENTION

In one embodiment of the disclosure, a coupler for coupling a component to a portion of a utility vehicle is provided. The coupler comprises a main body including a head, a central extension, a first plurality of securing members, and a second plurality of securing members, and a fastener configured to couple with the main body.

In another embodiment of the disclosure, a cover assembly configured to extend over an opening in a cargo area of a utility vehicle is provided. The cover assembly comprises a stationary portion coupled to the cargo area adjacent the opening, a pivotable portion including at least one arm, and at least one coupling assembly coupling the at least one arm of the pivotable portion to the stationary portion, the at least one coupling assembly including a stationary mount, a torque insert coupled to the at least on arm and the stationary mount, and a torsion spring received around a portion of the stationary amount and at least a portion of the torque insert.

In yet another embodiment, a vehicle is provided, comprising a frame, front and rear ground engaging members supporting the frame, a powertrain drivingly coupled to at least one of the front and rear wheels, a seating area supported by the frame, a cargo area supported by the frame, and a cover assembly configured to cover an opening in the cargo area, the cover assembly coupled to the cargo area through at least one latch, wherein at least one mount for the at least one latch is integral with the cargo area.

BRIEF DESCRIPTION OF THE DRAWINGS

FIG. 9 shows a bottom perspective view of the coupler, the roof, and the cab frame of FIG. 8;

FIG. 10 shows cross-sectional view of the coupler, the roof, and the cab frame of FIG. 8 taken along line 10-10 of FIG. 9;

FIG. 22 shows a detailed view of a coupling mechanism for coupling a pivotable portion of the cover assembly to a stationary portion of the cover assembly of FIG. 19; and FIG. 23 shows an exploded view of the coupling mechanism of FIG. 22.

DETAILED DESCRIPTION OF THE DRAWINGS

Figure 1:
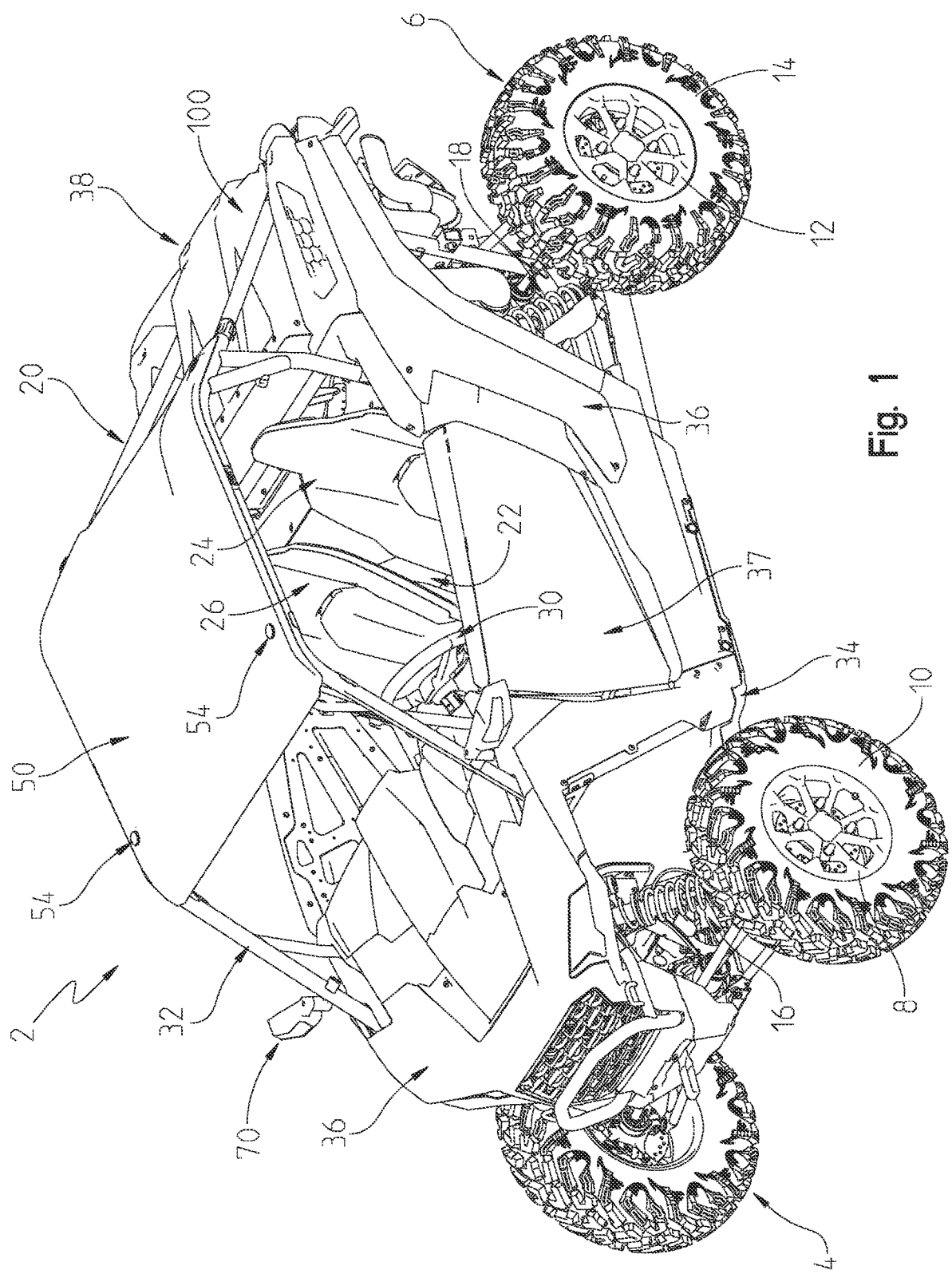
FIG. 1 shows a front left perspective view of a vehicle of the present disclosure.
Figure 2:
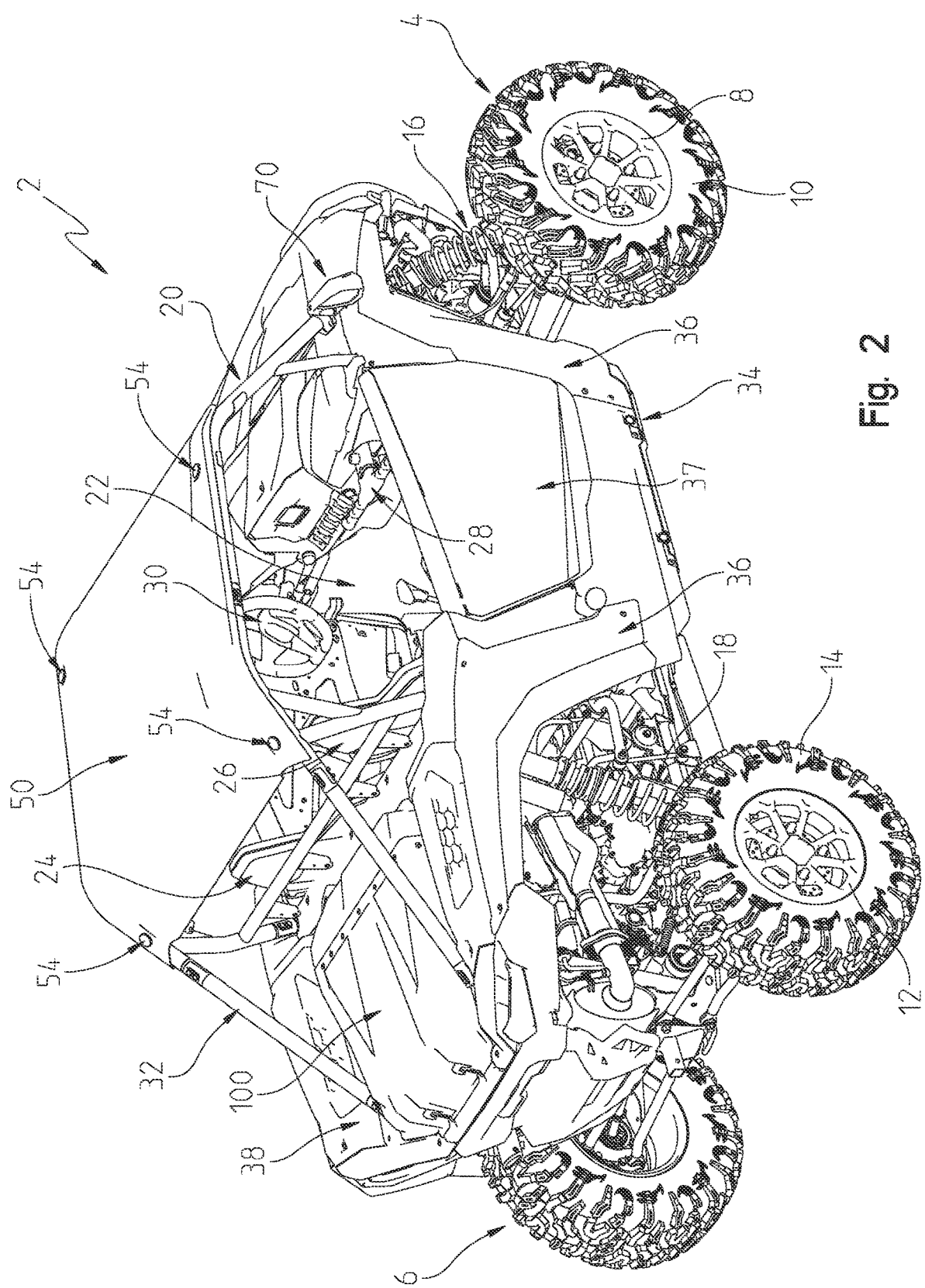
FIG. 2 shows a right rear perspective view of the vehicle of FIG. 1.
Figure 3:
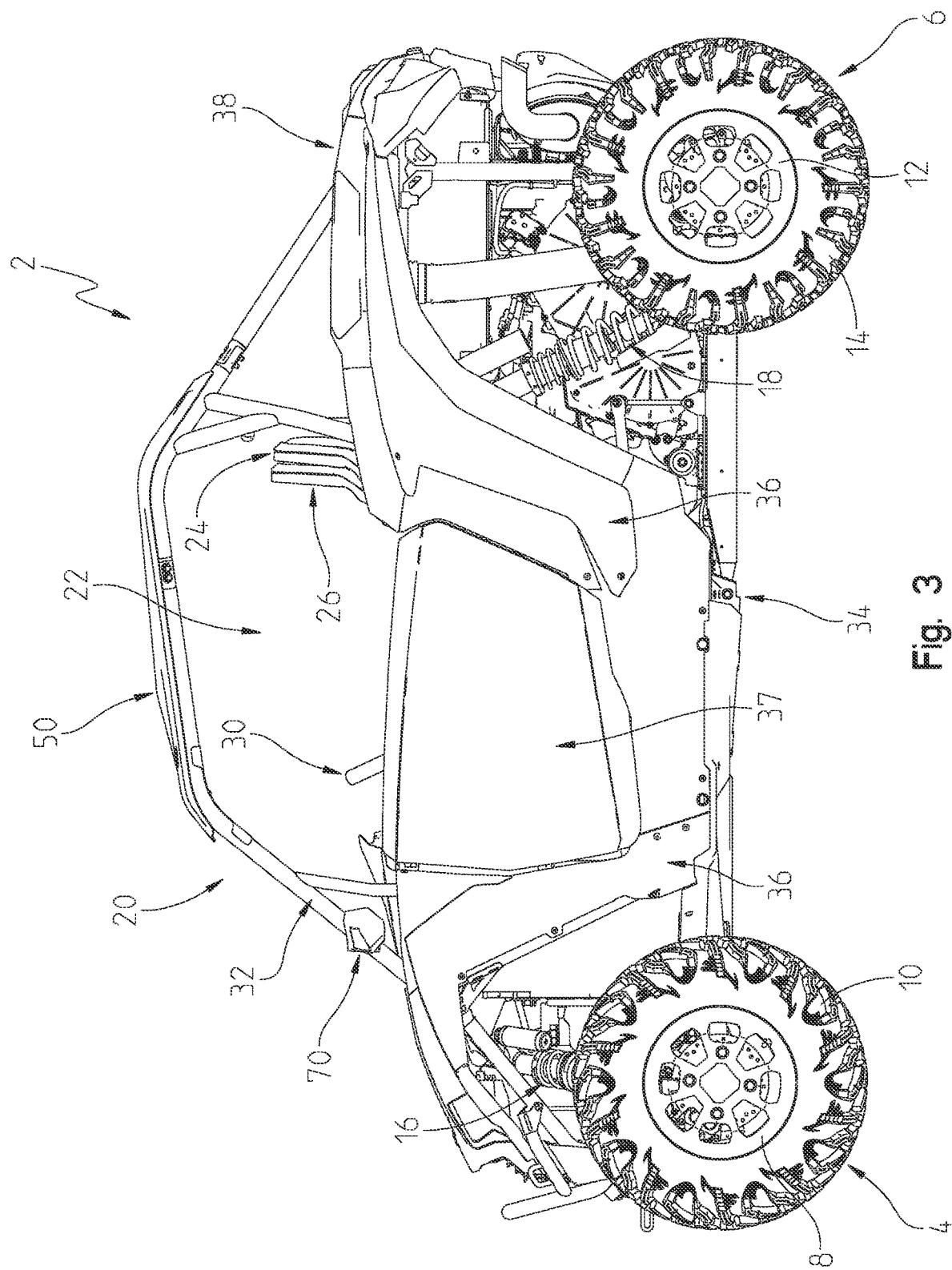
FIG. 3 shows a left elevational side view of the vehicle of FIG. 1.
Figure 4:
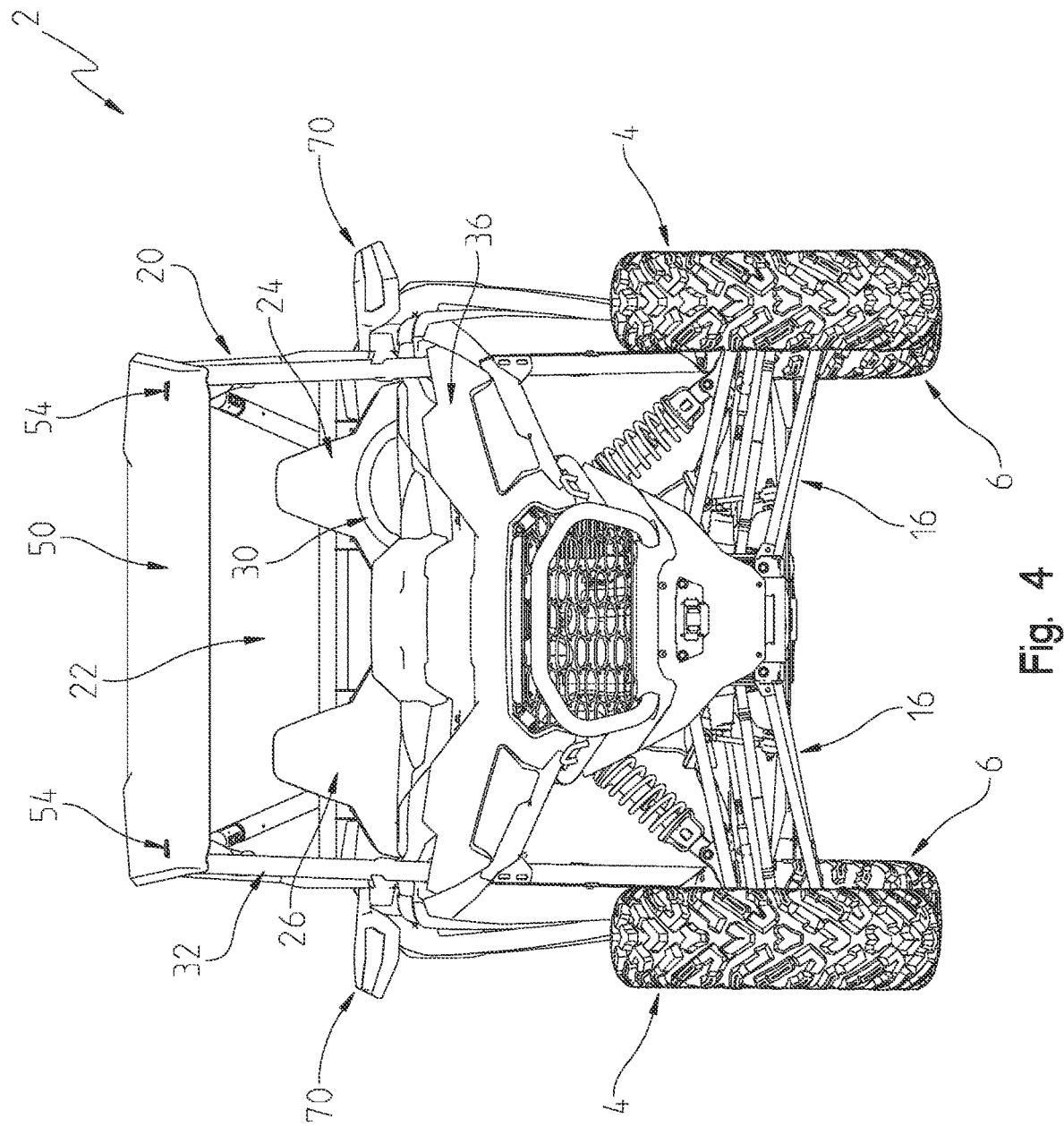
FIG. 4 shows a front elevational view of the vehicle of FIG. 1.
Figure 5:
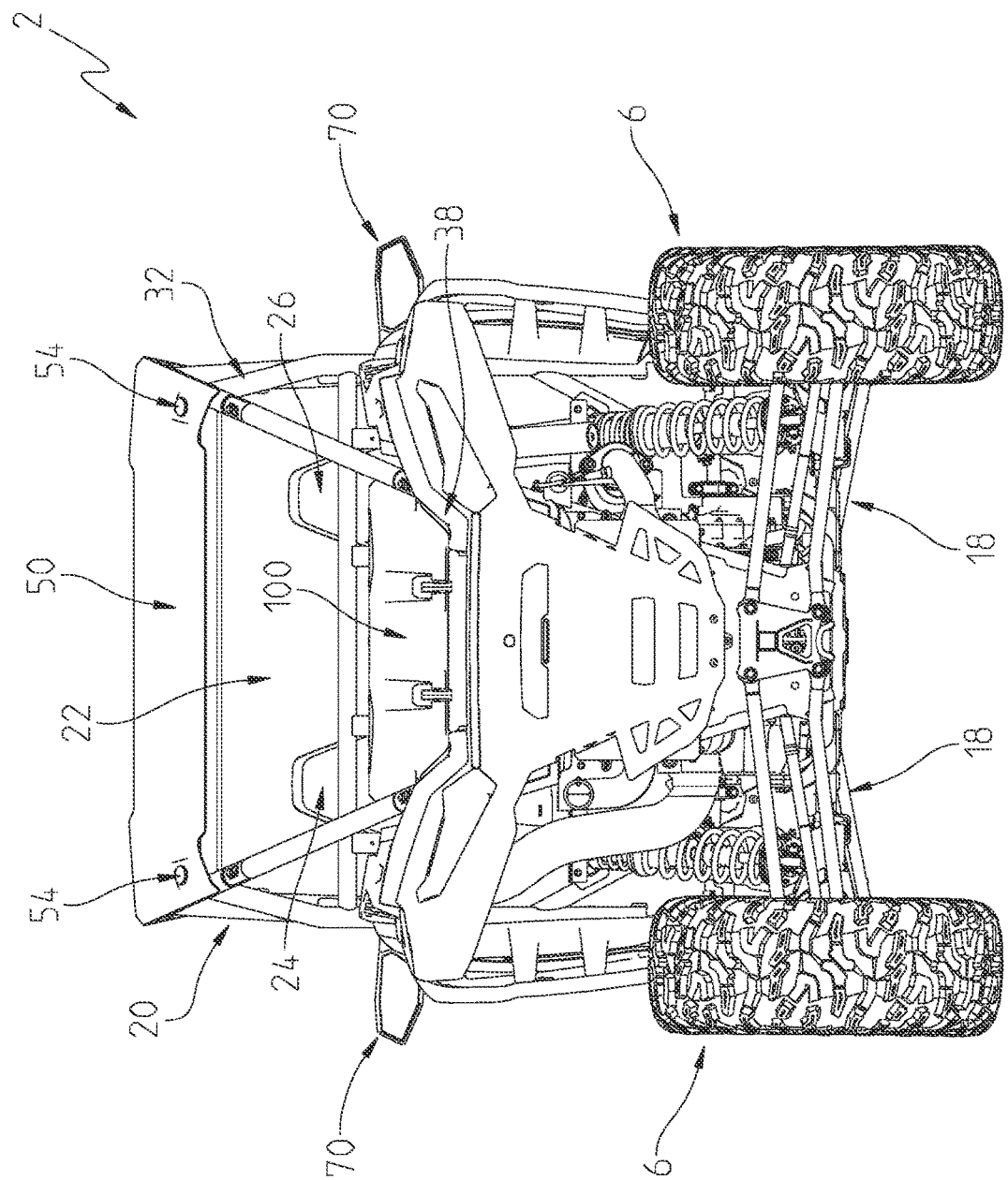
FIG. 5 shows a rear elevational view of the vehicle of FIG. 1.

With reference first to FIGS. 1-5, the vehicle of the present invention will be described. As shown, the vehicle is generally depicted as reference number 2 which includes front ground engaging members 4 and rear ground engaging members 6. Front ground engaging members 4 are comprised of rims 8 and tires 10, and rear ground engaging members 6 are comprised of rims 12 and tires 14. Ground engaging members 4 and 6 support a vehicle frame, which is shown generally at 20, through front and rear suspension assemblies 16 and 18, respectively. Vehicle frame 20 supports a seating area 22 comprised of a driver's seat 24 and a passenger seat 26. A passenger grab bar 28 (FIG. 2) is provided for a passenger in seat 26, as further disclosed and shown in U.S. patent application Ser. No. 17/034,077, the complete disclosure of which is expressly incorporated by reference herein. As best shown in FIG. 2, vehicle 2 further includes a steering assembly for steering front ground engaging members 4 whereby the steering assembly includes a steering wheel 30 which is both tiltable and longitudinally movable.

Frame 20 of vehicle 2 is comprised of a cab frame 32 that generally extends over seating area 22 and a lower frame portion 34 positioned below and supporting cab frame 32. Frame 20 is configured to support a plurality of body panels 36, such as a hood, front fenders, and rear fenders, doors 37, and a cargo area 38.

Referring now to FIGS. 6-12, cab frame 32 of frame 20 will be described in further detail. Cab frame 32 generally includes a pair of longitudinally-extending frame members 40, each including a front upwardly angled frame tube 42, a horizontal frame tube 43, and a rear downwardly angled frame tube 44, where horizontal frame tube 43 extends between front upwardly angled frame tube 42 and rear downwardly angled frame tube 44. Cab frame 32 may further include a first cross bar 45 coupled between frame members 40, and more specifically, between an upper end 42a of front upwardly angled frame tubes 42 and a forward end 43a of horizontal frame tubes 43, a second cross bar 46 coupled between frame members 40, and more specifically, between a middle portion 43b of horizontal frame tubes 43, and a third cross bar 47 coupled between frame members 40, and more specifically, between a middle portion 44a of rear downwardly angled frame tubes 44. In various embodiments, cab frame 32 is configured to support a roof 50 and/or at least one mirror assembly 70 (FIG. 11), illustratively two mirror assemblies 70, as further detailed below.

Figure 6:
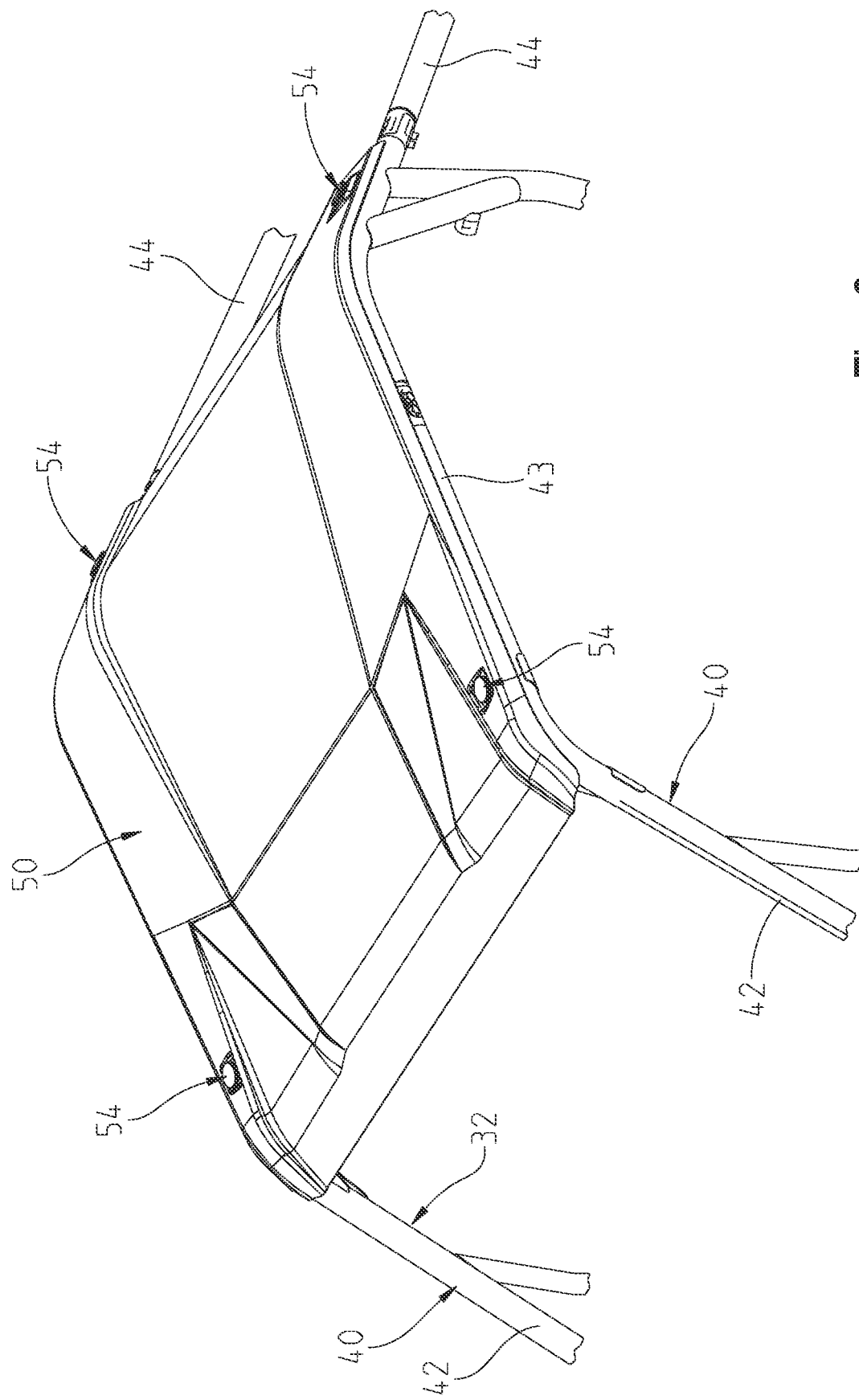
FIG. 6 shows a front left perspective view of a roof coupled to a cab frame of the vehicle of FIG. 1.
Figure 7:
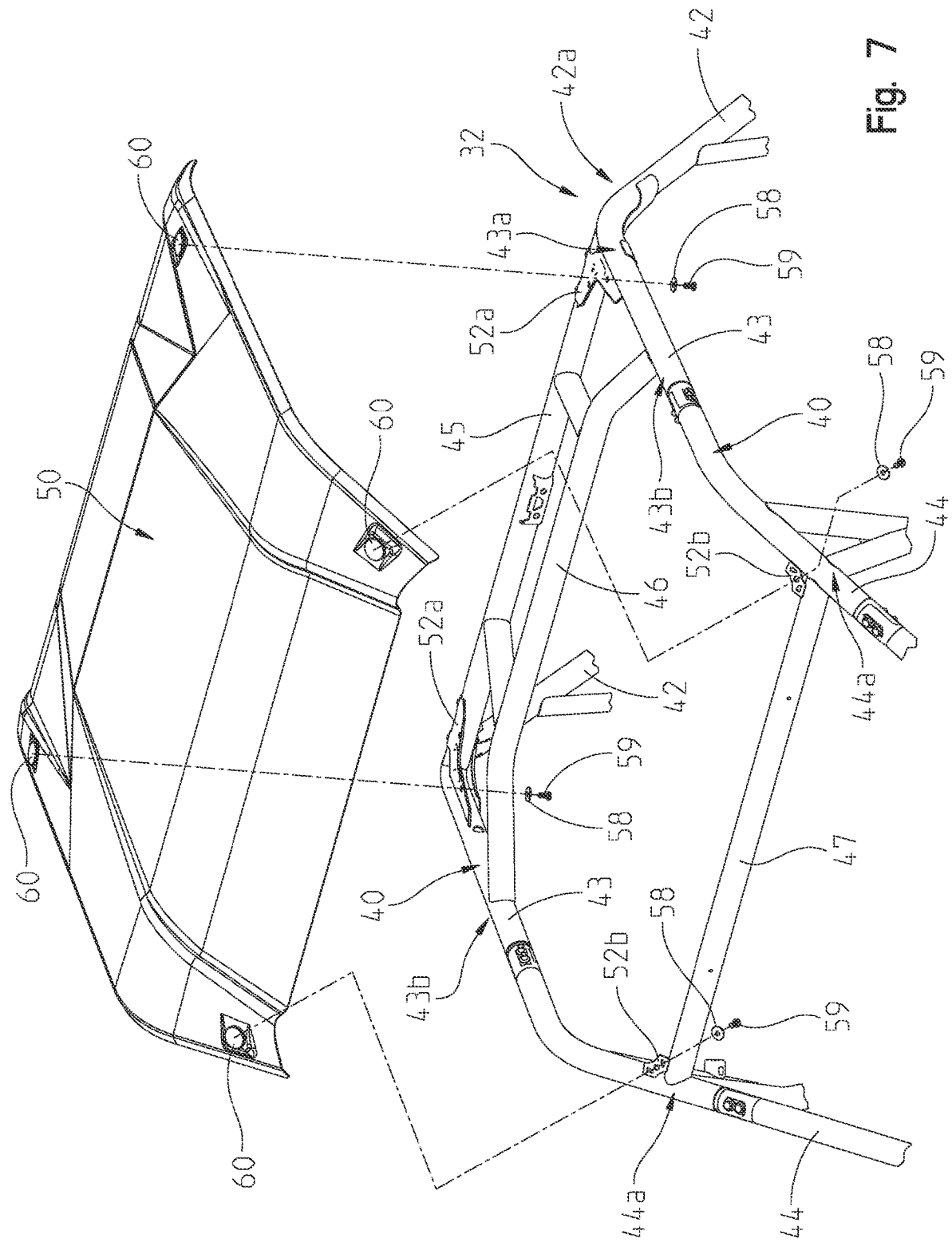
FIG. 7 shows an exploded view of the roof and the cab frame of FIG. 6.

With reference to FIGS. 6 and 7, roof 50, which is supported by cab frame 32, will be described in further detail. Roof 50 generally extends from a position forward of horizontal frame tubes 43 to a position rearward of horizontal frame tubes 43, and contours or bends with frame members 40 as front frame tube 42 transitions into horizontal frame tube 43 and as horizontal frame tube 43 transitions into rear frame tube 44. In various embodiments, roof 50 may be a formed aluminum roof with foam (not shown) positioned between roof 50 and cab frame 32. Roof 50 is generally coupled to cab frame 32 via a plurality of couplers 54. In various embodiments, roof 50 and couplers 54 are coupled to brackets 52 of cab frame 32. Brackets 52 include a pair of front brackets 52a each coupled to cab frame 32 between first cross bar 45 and horizontal frame tube 43 of one of frame members 40, and a pair of rear brackets 52b each coupled to cab frame 32 between third cross bar 47 and rear downwardly angled frame tube 44 of one of frame member 40. In various embodiments, front brackets 52a and rear brackets 52b are angled between cross bars 45 and 47, respectively, and frame members 40.

Figure 8:
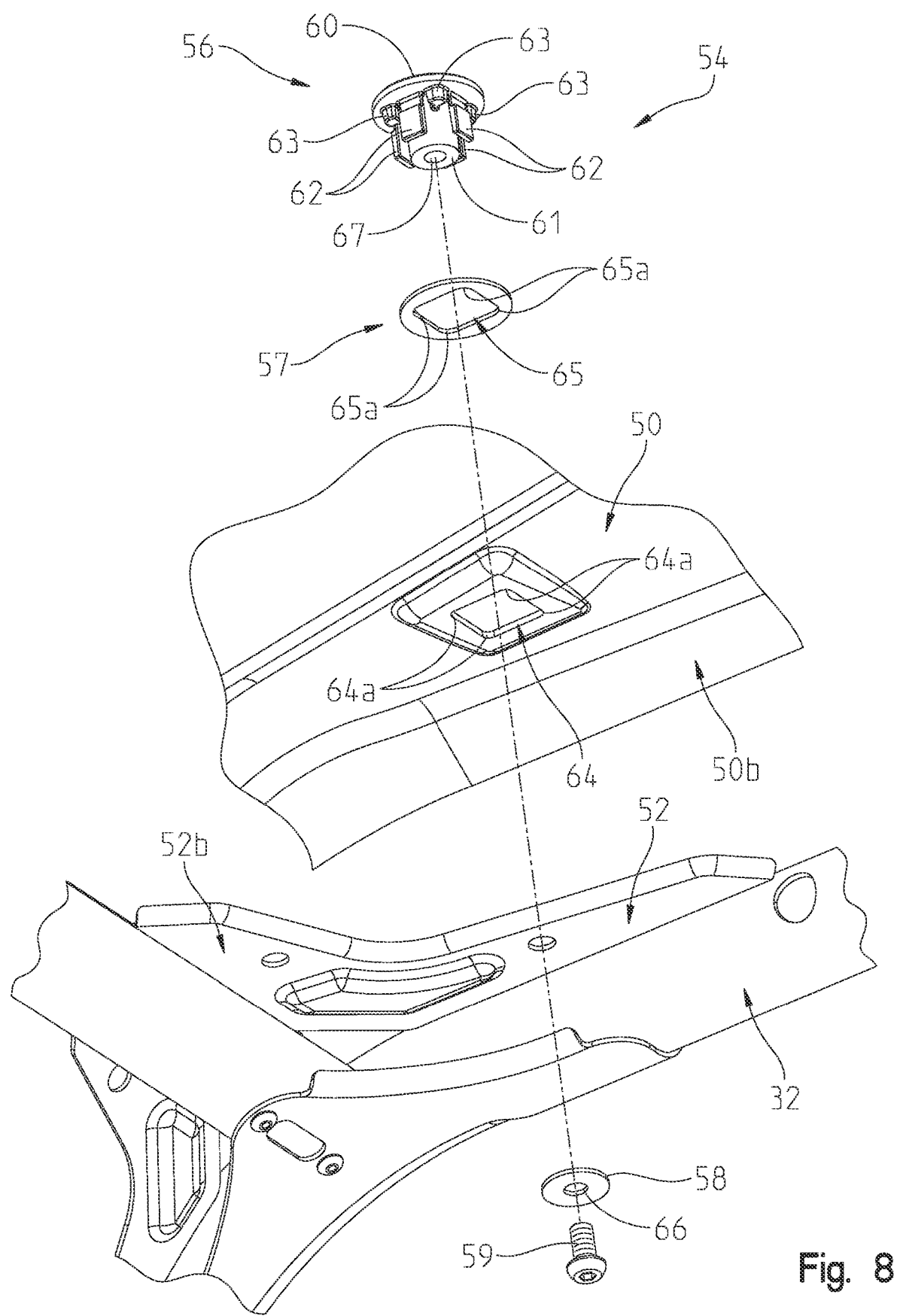
FIG. 8 shows an exploded view of a coupler of the present disclosure coupling the roof and the cab frame of FIG. 6.

Referring now to FIGS. 8-10, couplers 54 coupling roof 50 to cab frame 32 will be described in further detail. Illustratively, couplers 54 are shown coupling roof 50 to one of brackets 52 of cab frame 32, where a spacing S extends between a lower surface 50b of roof 50 and bracket 52. This spacing S allows for roof 50 to be held tightly or rigidly to cab frame 32 while not over compressing the foam between roof 50 and cab frame 32. For example, coupler 54 may allow for foam to be around 30-50% compressed rather than almost fully compressed (e.g., 70-90% compressed).

Couplers 54 generally include a main body 56, and a fastener 59 configured to be received by main body 56. In various embodiments, coupler 54 may further include a first washer 57 and/or a second washer 58. Main body 56 generally includes a head 60, an extension 61 extending down from head 60, a plurality of securing tabs 62 extending down from head 60 around extension 61, and a plurality of securing nubs 63 extending down from head 60 and positioned between securing tabs 62. Head 60 includes an upper surface 60a and a lower surface 60b, where upper surface 60a is a smooth, toolless exterior surface exposed with an upper surface 50a roof 50 and lower surface 60b abuts upper surface 50a of roof 50. Main body 56 of coupler 54 is configured to pass through an opening 64 in roof 50 until lower surface 60b of head 60 abuts upper surface 50a of roof 50 surrounding opening 64. In various embodiments, opening 64 in roof 50 is a rounded square in shape, such that securing tabs 62 and securing nubs 63 snap into or otherwise fit through and/or within opening 64, as further described below.

First washer 57 of coupler 54 includes an opening 65 configured to receive main body 56. First washer 57 is configured to be positioned between upper surface 50a of roof 50 and lower surface 60b of head 60 when coupler 54 is coupling roof 50 to cab frame 32. In various embodiments, first washer 57 is circular in shape, and opening 65 is a rounded square in shape such that opening 65 matches the shape of opening 64 in roof 50. Second washer 58 of coupler 54 also includes an opening 66 configured to receive fastener 59. Second washer 58 is configured to be positioned between fastener 59 and lower surface 52b of bracket 52 when coupler 54 is coupling roof 50 to cab frame 32. In various embodiments, second washer 58 and opening 66 are both circular in shape. First washer 57 and/or second washer 58 may formed of various materials, including rubber, metal, plastic, etc.

Still referencing FIGS. 8-10, extension 61 of main body 56 includes an opening 67 configured to receive fastener 59. Extension 61 may also act as a spacer between roof 50 and cab frame 32 to provide spacing S extending between lower surface 50b of roof 50 and bracket 52. Illustratively, extension 61 is generally cylindrical in shape, however, it should be appreciated that extension 61 may be provided in other shapes. In various embodiments, a metal threaded insert 55 (FIG. 10) may be received within opening 67 to assist in receiving fastener 59, which may be a screw or other fastener.

Securing tabs 62 and securing nubs 63 help to secure main body 56 within opening 64 of roof 50, when coupler 54 is coupling roof 50 to cab frame 32. Securing tabs 62 each include a lip 68 and an indentation 69 (FIG. 10), where indentation 69 extends between lip 68 and lower surface 60b of head 60. Indentation 69 is configured to extend through opening 64 in roof 50 and opening 65 in first washer 57 such that indentation 69 receives a portion of roof 50 adjacent opening 64 and a portion of first washer 57 adjacent opening 64 therewithin when coupler 54 is coupling roof 50 to cab frame 32. Securing nubs 63 extend downwardly from head 60 and are configured to be received within corners 64a of opening 64 in roof 50 and corners 65a of opening 65 in first washer 57. Securing nubs 63 help secure coupler 54 within opening 64 and help prevent rotation of coupler 54 within opening 64 in roof 50 when main body 56 is received within opening 64. In various embodiments, main body 56 includes four securing tabs 62 and four securing nubs 63, where each securing tab 62 extends between two securing nubs 63 such that securing nubs 63 and securing tabs 62 are in a square pattern.

It should be appreciated, that couplers 54 may further be used to couple other various components, for example other body panels or other components to frame 20 or other portions of vehicle 2.

Figure 11:
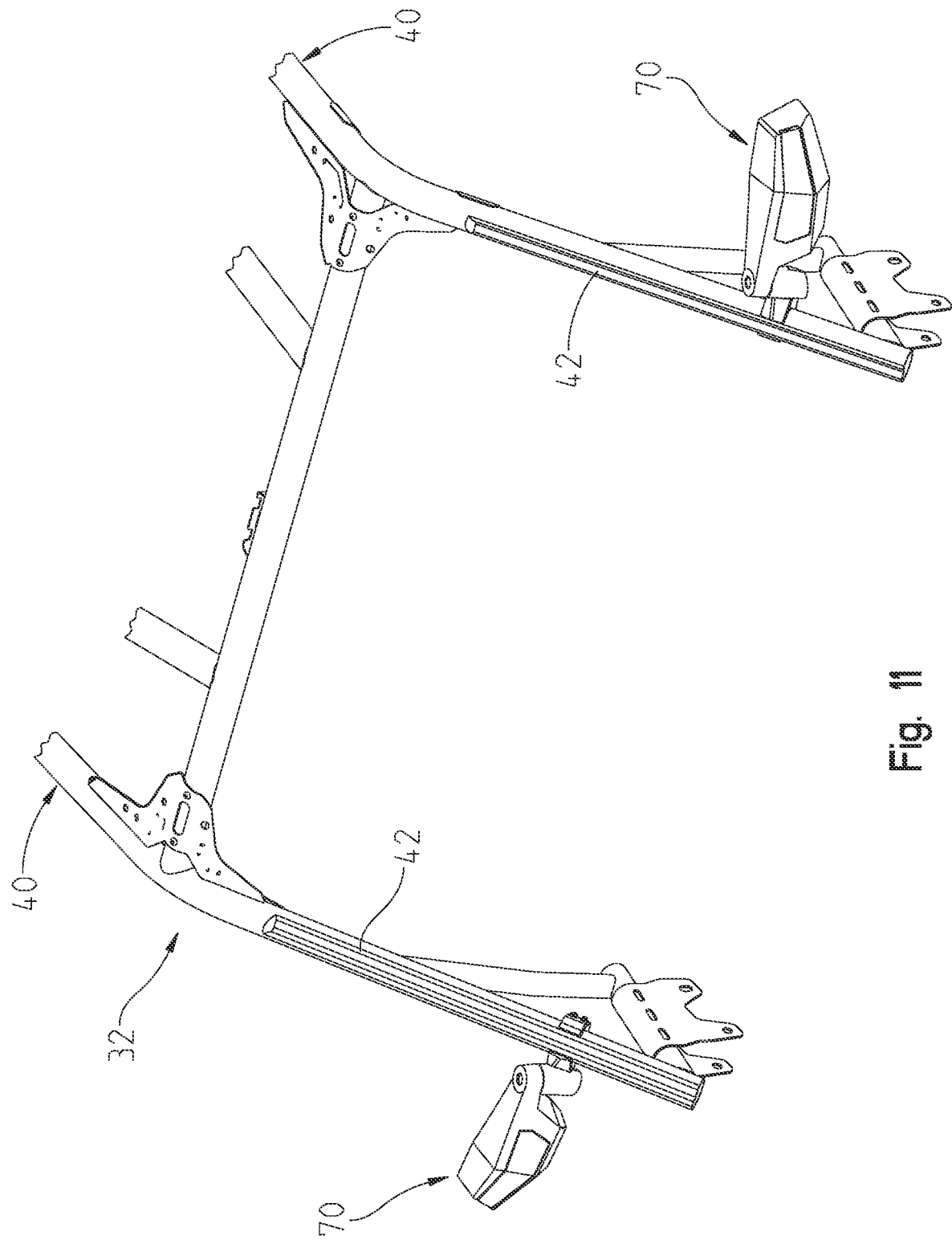
FIG. 11 shows front left perspective view of a set of mirror assemblies of the present disclosure coupled to the cab frame of the vehicle of FIG. 1.
Figure 12:
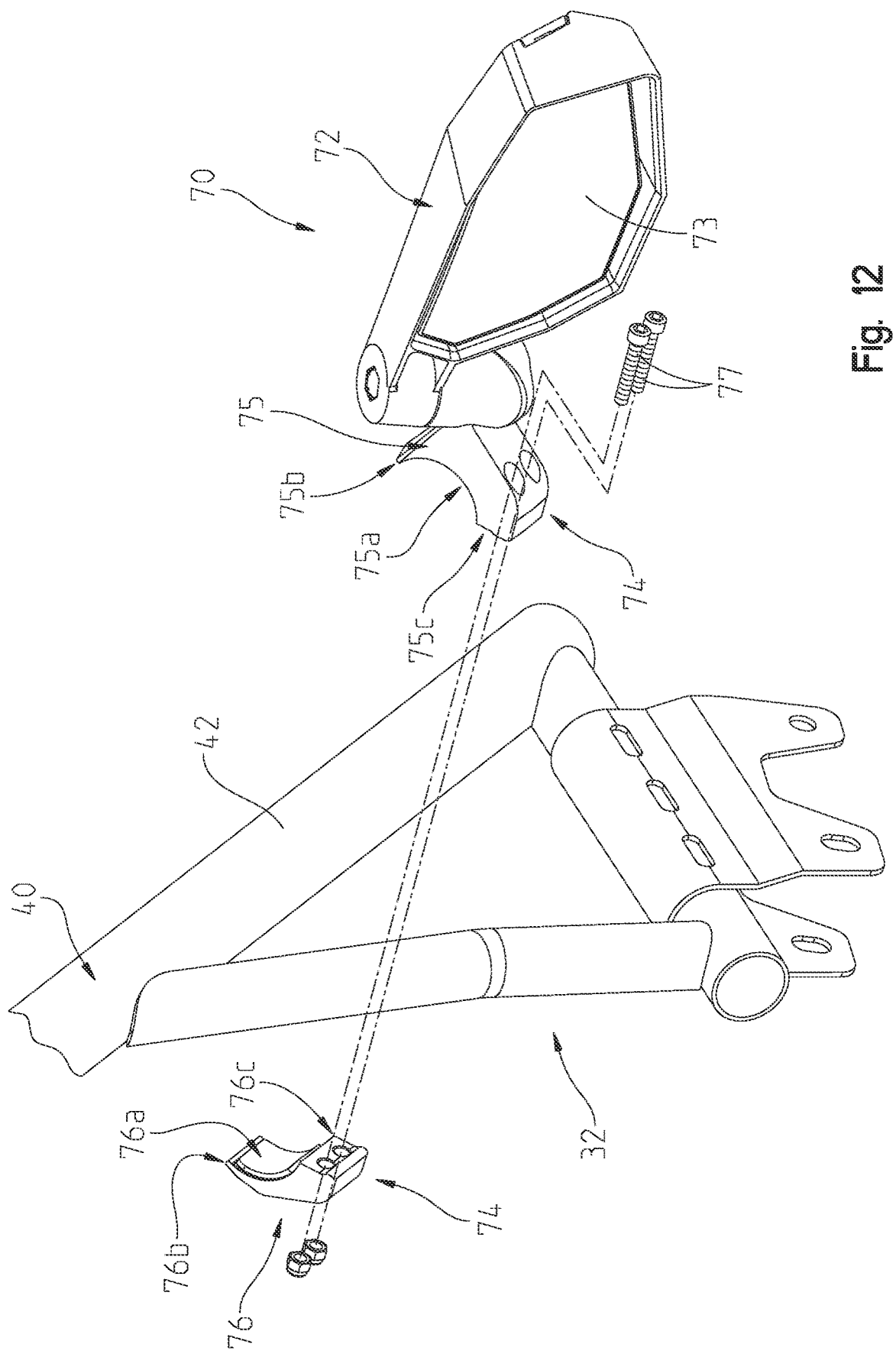
FIG. 12 shows an exploded view of one of the mirror assemblies of FIG. 11.
Figure 13:
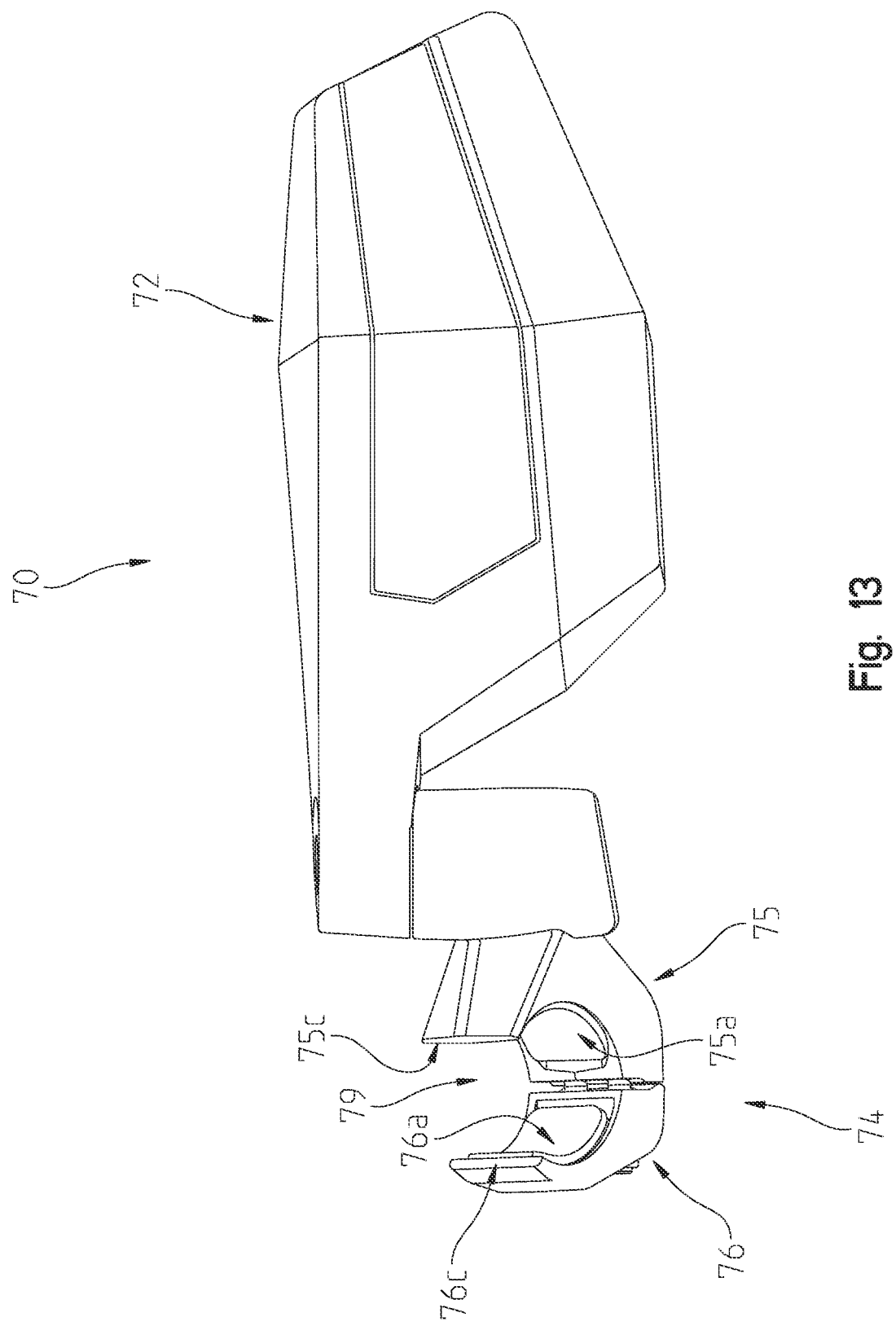
FIG. 13 shows a front elevational view of one of the mirror assemblies of FIG. 11.

Referring now to FIGS. 11-13, mirror assembly 70, which is supported by cab frame 32, will be described in further detail. Illustratively, vehicle 2 includes two mirror assemblies 70, one supported on each of frame members 40. Mirror assembly 70 generally includes a mirror body 72 rotatably or fixedly coupled to a securing component 74, where mirror body 72 supports a mirror 73. Securing component 74 is configured to be received around frame member 40 of cab frame 32, illustratively front frame tube 42. Securing component 74 includes a first portion 75 coupled to mirror body 72, and a second portion 76 configured to be coupled to first portion 75 via at least one coupler 77, illustratively two couplers 77. Each of first portion 75 and second portion 76 includes an indented surface 75a, 76a, respectively, configured to abut a portion of frame member 40. In various embodiments, indented surfaces 75a, 76a are flush from a first end 75b, 76b of portions 75 and 76 to a second end 75c, 76c of portions 75 and 76. Indented surfaces 75a and 76a as well as the contour of first and second portions 75 and 76 allow mirror assembly 70 to be coupled to profiled or other non-rounded frame tubes as well as rounded frame tubes. When coupling mirror assembly 70 to cab frame 32, indented surface 75a of first portion 75 abuts a first side surface of frame member 40, illustratively an exterior side surface, indented surface 76a of second portion 76 abuts a second side surface of frame member 40, illustratively an interior side surface, and first and second portions 75, 76 are coupled together at first ends 75b, 76b of portions 75 and 76 via couplers 77 such that frame member 40 supports mirror assembly 70, with mirror assembly 70 extending outward from a side of vehicle 2. When mirror assembly 70 is coupled to frame member 40, an opening 79 extends between second ends 75c, 76c of portions 75 and 76, where opening 76 faces a direction opposite that of mirror 73. Illustratively, opening 76 faces forward, while mirror 73 faces rearward.

With reference now to FIGS. 14-18, vehicle 2 includes a dash 80 adjacent seating area 22 that is configured to support a sound system 82 among other things. Sound system 82 generally includes a set of speaker assemblies 84 and a subwoofer assembly 90.

Figure 14:
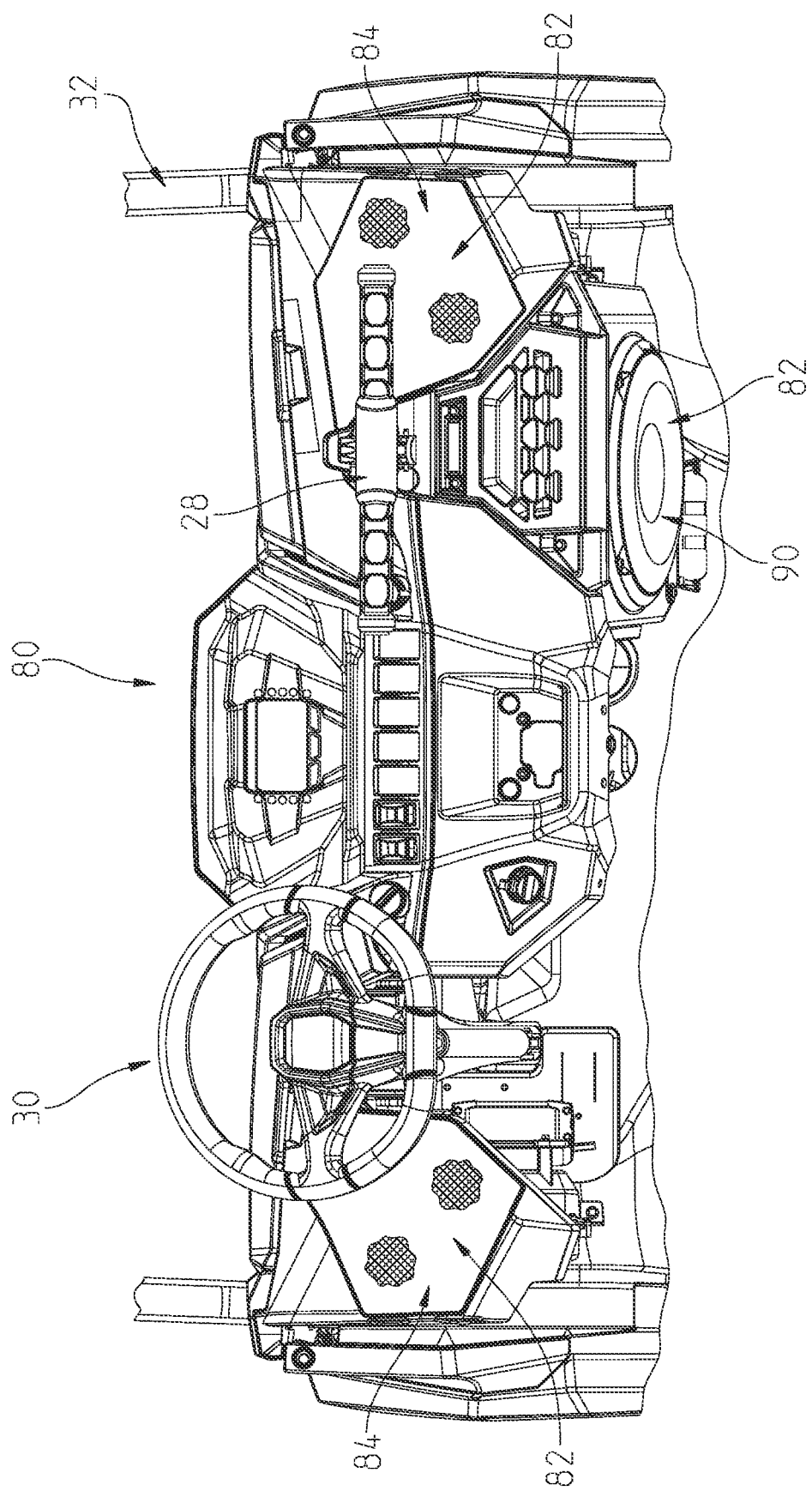
FIG. 14 shows a rear elevational view of a dash of the vehicle of FIG. 1.
Figure 15:
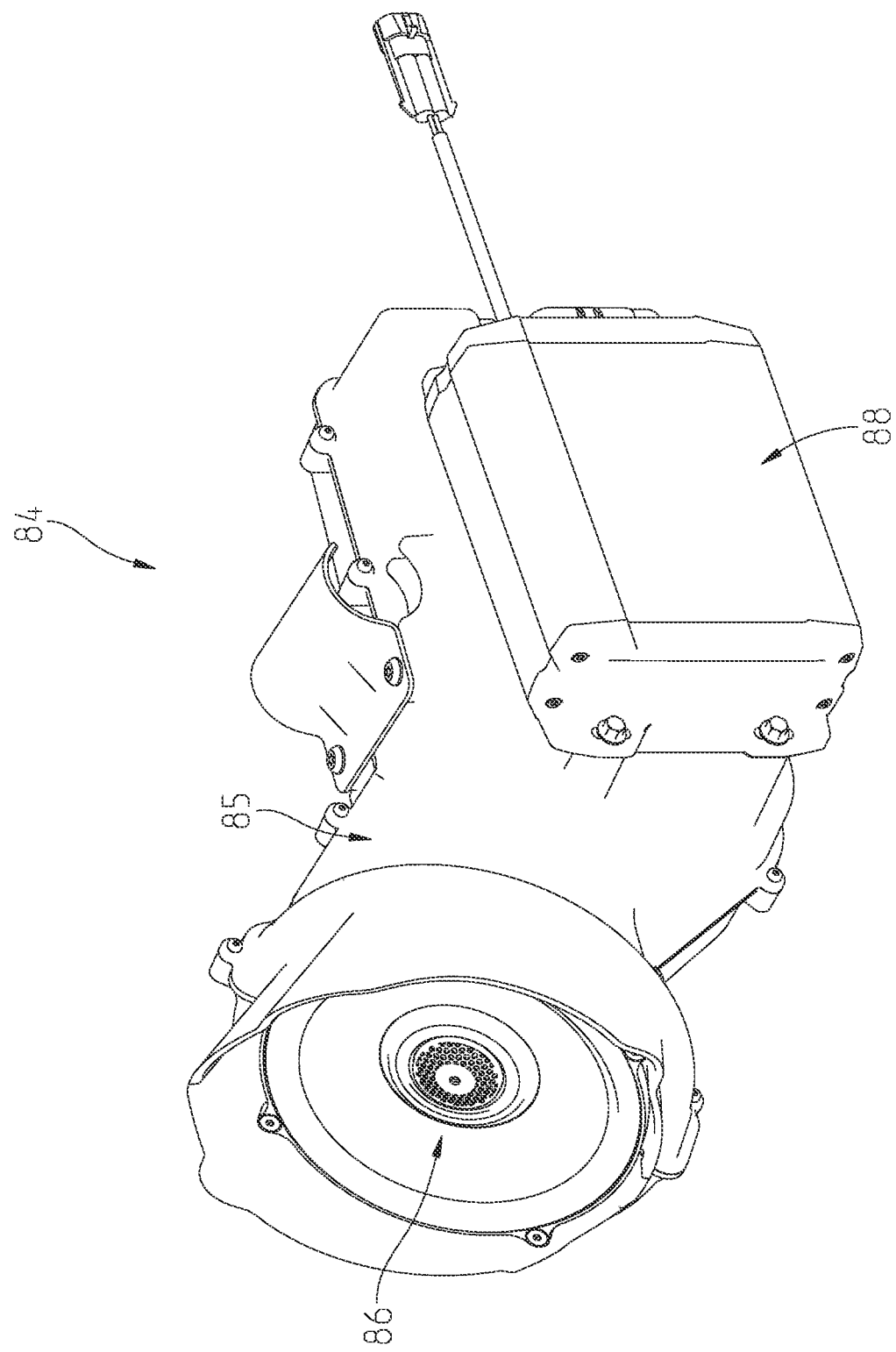
FIG. 15 shows a front left perspective view of a speaker enclosure and an amplifier of the present disclosure.
Figure 16:
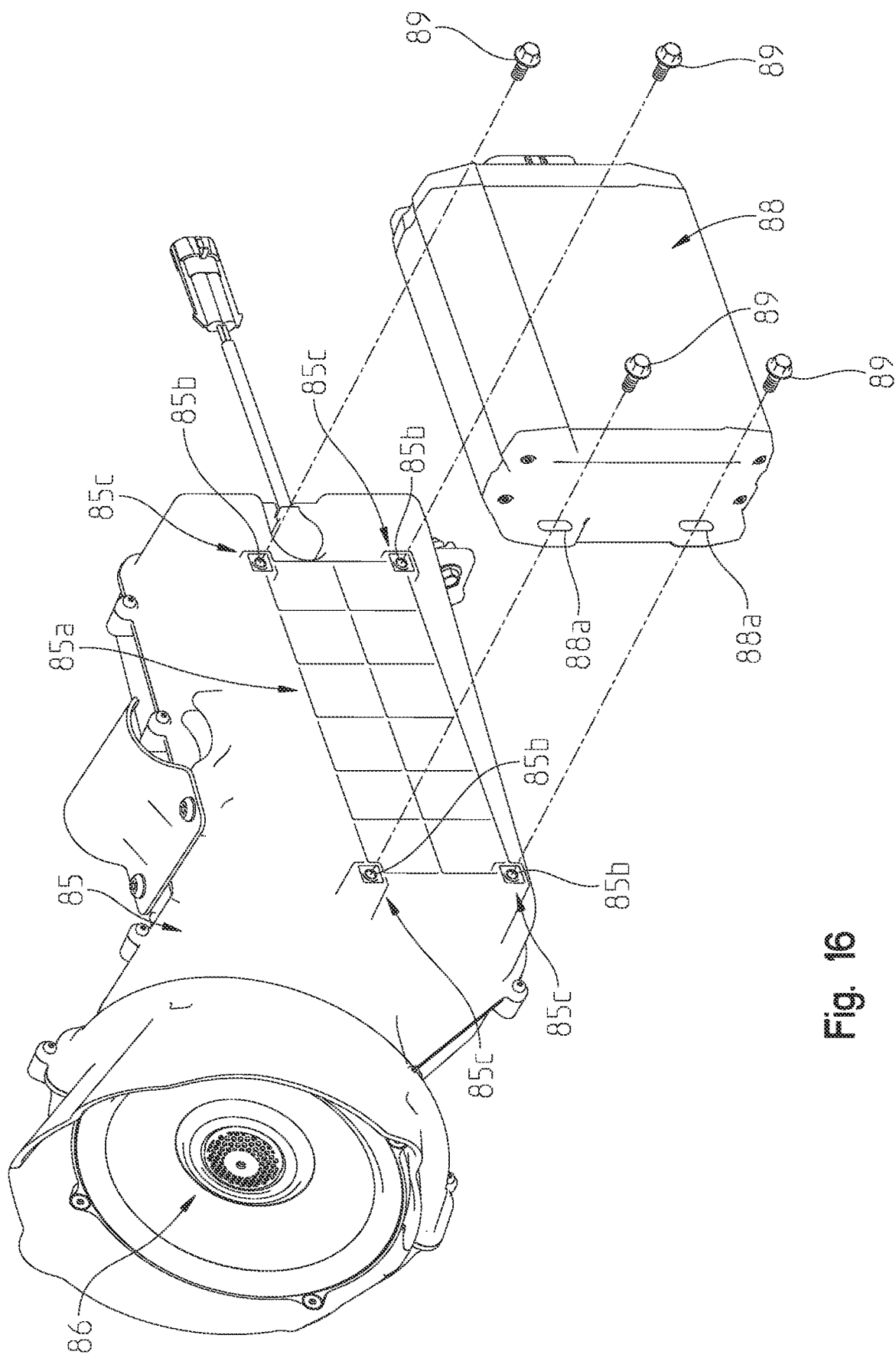
FIG. 16 shows an exploded view of the speaker enclosure and the amplifier of FIG. 15.

Referring to FIGS. 14-16, speaker assemblies 84 are mounted to frame 20 on either side of dash 80 and include a speaker enclosure 85 housing a speaker 86. At least one of speaker assemblies 84 further includes an amplifier 88. In various embodiments, speaker assembly 84 on the driver's side of vehicle 2 includes amplifier 88. Amplifier 88 is generally coupled to a side surface 85a of speaker enclosure 85, where side surface 85a is an interior side of speaker enclosure 85. Illustratively, amplifier 88 is coupled to openings 85b and mounting bosses 85c molded into speaker enclosure 85 via couplers 89 which extend through openings 88a of amplifier 88. In this way, amplifier 88 is directly coupled to speaker enclosure 85.

Figure 17:
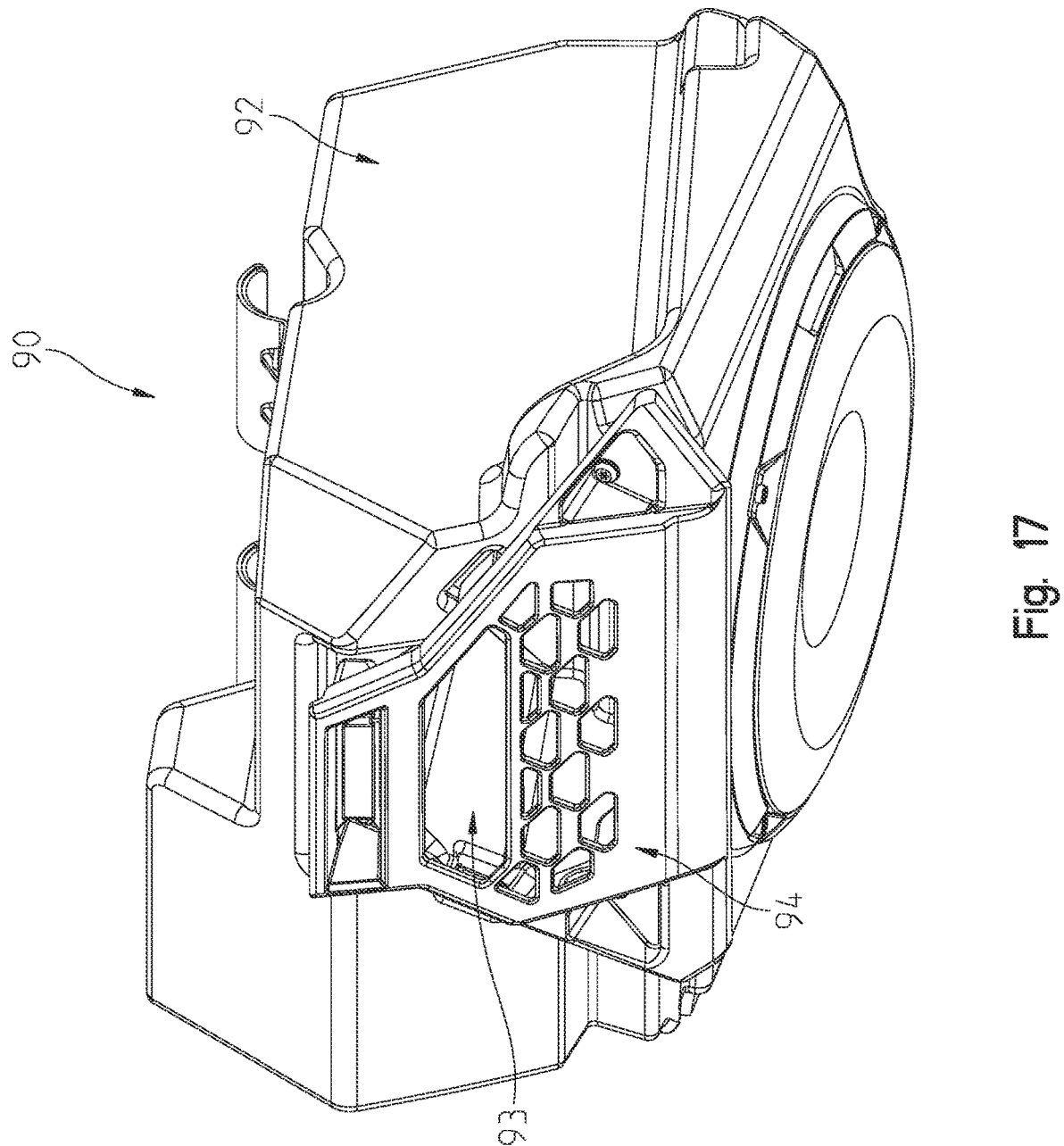
FIG. 17 shows a perspective view of a subwoofer of the present disclosure.
Figure 18:
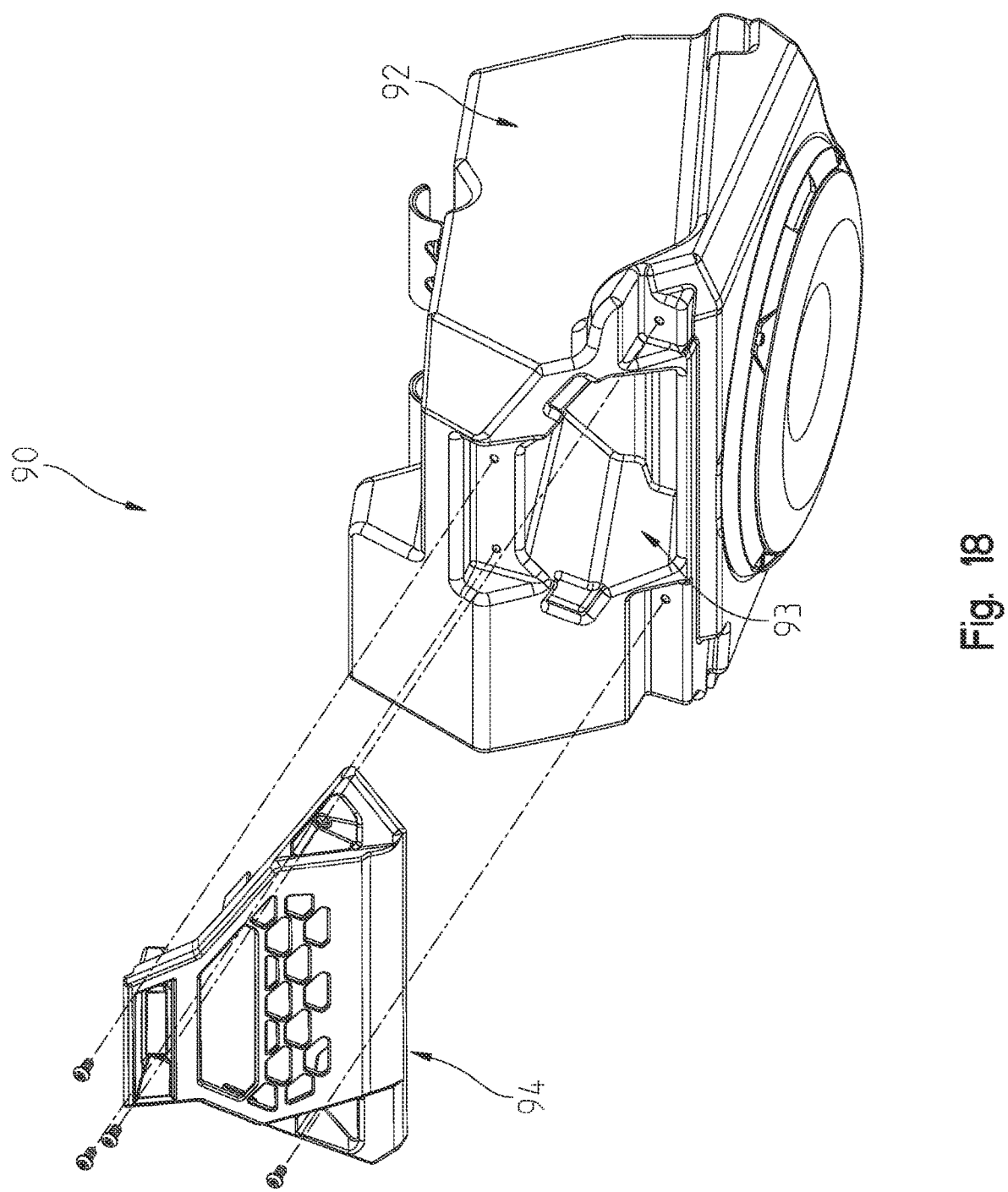
FIG. 18 shows an exploded view of the subwoofer of FIG. 17.
Figure 19:
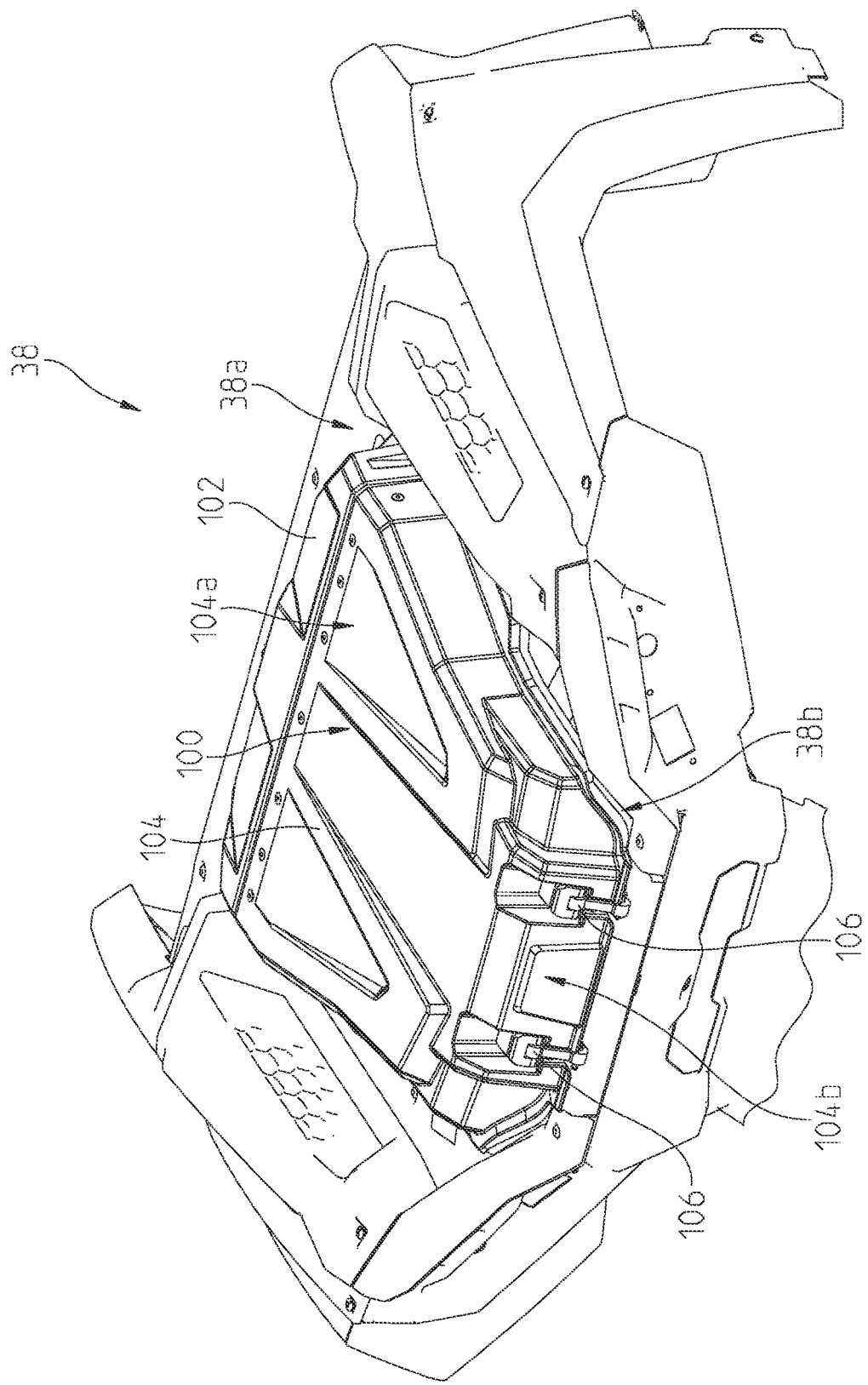
FIG. 19 shows a rear right perspective view of a cover assembly of the present disclosure in a closed position enclosing an opening in a cargo area of the vehicle of FIG. 1.

With reference to FIGS. 17 and 18, subwoofer assembly 90 is coupled to frame 20 within dash 80 on the passenger's side of vehicle 2. Subwoofer assembly 90 includes an enclosure body 92 and a securing net 94. Enclosure body 92 includes a storage area 93 built therein and securing net 94 is configured to couple to enclosure body 92 over storage area 93. In various embodiments, securing net 94 is a semi-rigid, semi-flexible material. It may be appreciated that subwoofer assembly 90 is generally positioned within or adjacent a volume normally defined as the glove box or glove compartment of the vehicle; however, storage area 93 continues to provide storage ability on vehicle 2 even when subwoofer assembly 90 is included on vehicle 2.

Referring now to FIGS. 19-22, in various embodiments, vehicle 2 may include a cover 100 positioned over an opening 39 within bed or cargo area 38. Bed or cargo area 38 may include indents and/or gasket surfaces for receiving cover 100 therein to provide a sealed coupling between cover 100 and cargo area 38. Cover 100 generally includes a stationary portion 102 fixedly coupled to a forward portion 38a of cargo area 38 and a pivotable portion 104 coupled to stationary portion 102 at a first end 104a and to a rear portion 38b of cargo area 38 at a second end 104b. In various embodiments, second end 104b of pivotable portion 104 is coupled to rear portion 38b of cargo area 38 via latches 106. Latches 106 are removably coupled to cargo area 38 via mounting recesses 107, where mounting recesses 107 may be integrated directly into or integrally formed with cargo area 38. When coupling latches 106 to mounting recesses 107, a pin 105 is slid into an opening (not shown) in a first end 106a of latches 106 and received within holes (not shown) in mounting recess 107 of cargo area 38. In this way, latches 106 may be removed from vehicle 2. In various embodiments, first end 106a of latches 106 is formed of a bendable material, such a rubber, while a second end 106b of laches 106 is formed of a more rigid material, such as plastic. In various embodiments, a tire rack (not shown) may be coupled to and movable with pivotable portion 104 of cover 100.

With reference to FIGS. 20-23, pivotable portion 104 includes arms 108 coupled to stationary portion 102 via a coupling assembly 109 having a stationary mount 110, a torque insert 112 (FIG. 23), and a torsion spring 114. Arms 108 may be integrally formed with pivotable portion 104, and generally include a first opening 116 configured to receive torque insert 112 and a second opening 118 configured to receive a first arm 113 of torsion spring 114.

First opening 116 of arms 108 includes a main opening 120, a first channel 121 extending from one side of main opening 120, and a second channel 122 extending from another side of main opening 120. In various embodiments, first and second channels 121 and 122 extend from opposite sides of main opening 120. First channel 121 is configured to receive a first leg or extension 124 of a first end 112a of torque insert 112, while second channel 122 is configured to receive a second leg or extension 125 of first end 112a of torque insert 112. A second end 112b of torque insert 112 is received within an opening 126 within stationary mount 110. Similar to first opening 116 of arms 108, opening 126 within stationary mount 110 includes a main opening 128, a first channel 129 extending from one side of main opening 126, and a second channel 130 extending from another side of main opening 126. First channel 129 is configured to receive a first leg or extension 131 of second end 112b of torque insert 112, while second channel 130 is configured to receive a second leg or extension 132 of second end 112b of torque insert 112. Torque insert 112 provides resistance against/dampens torsion spring 114 to control movement of pivotable portion 104 and/or hold pivotable portion 104 in various positions.

Figure 20:
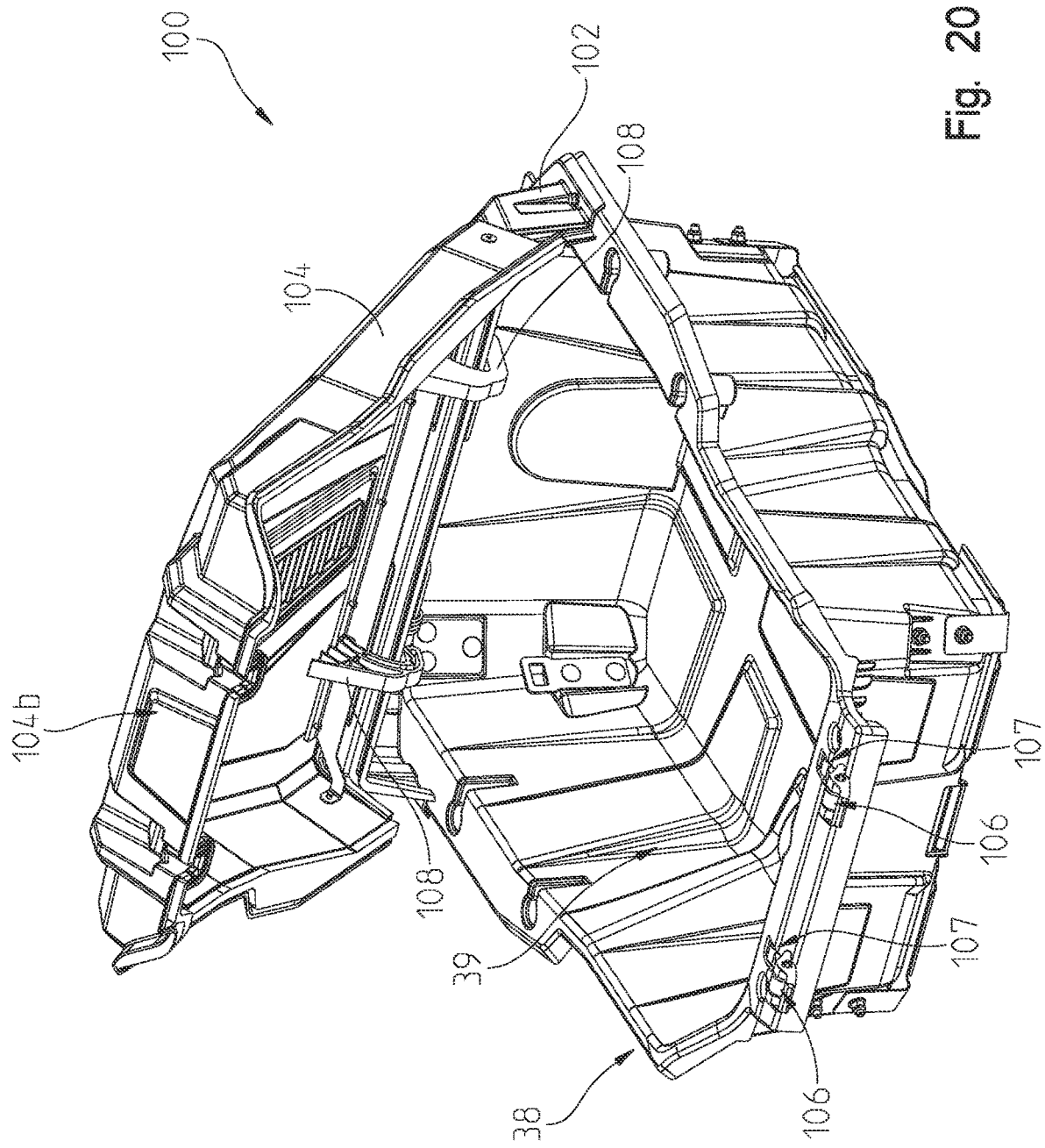
FIG. 20 shows rear right perspective view of the cover assembly of FIG. 19 in an open position over the opening in the cargo area.
Figure 21:
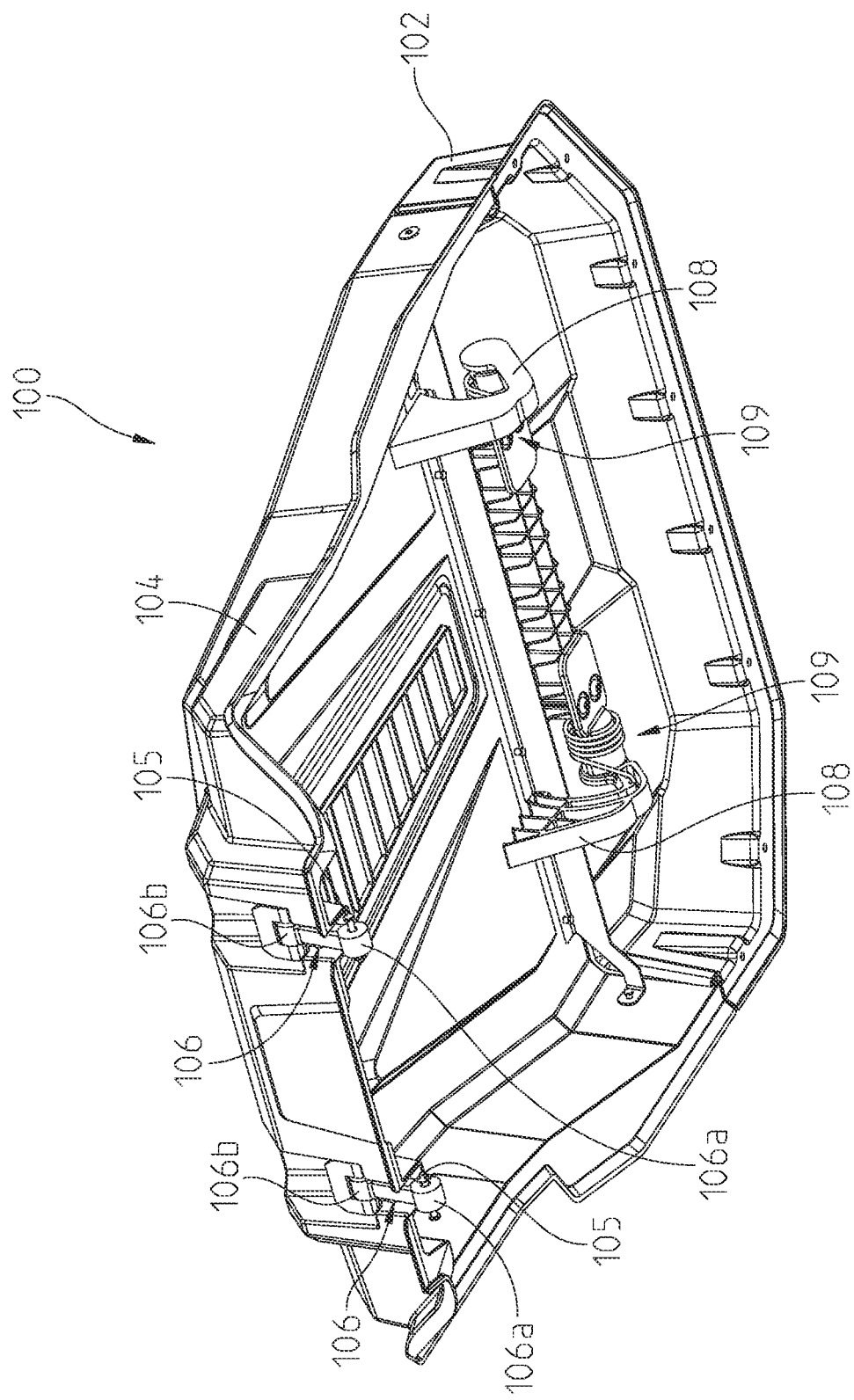
FIG. 21 shows a bottom perspective view of the cover assembly of FIG. 19.

Torsion spring 114 generally includes first arm 113, a second arm 115 supported by stationary portion 102, and a coiled portion 134 extended between first arm 113 and second arm 115. Torsion spring 114 provides torque lift assist to overcome friction when opening cover 100 so pivotable portion 104 can open fully and then aids with closing pivotable portion 104 as well. The combination of torsion spring 114 and torque insert 112 allows pivotable portion 104 of cover 100 to be held at any position between a closed position (FIG. 19) and an open position (FIG. 20).

Stationary mount 110 of coupling assembly 109 includes a plate 140 configured to be coupled to a lower surface 102a of stationary portion 102, and an extension 142 extending from an end 140a of plate 140. Plate 140 includes at least one opening 144, illustratively two openings 144, configured to receive couplers 145 (FIG. 22) for coupling plate 140 and therefore stationary mount 110 to stationary portion 102. Extension 142 includes opening 126, as discussed in detail above, for receiving a portion of torque insert 112. Coiled portion 134 of torsion spring 114 is received over or around extension 142 and therefore around opening 126 and torque insert 112.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A cover assembly configured to extend over an opening in a cargo area of a utility vehicle, the cover assembly comprising:
a stationary portion coupled to the cargo area adjacent the opening;
a pivotable portion including at least one arm; and
at least one coupling assembly coupling the at least one arm of the pivotable portion to the stationary portion, the at least one coupling assembly including a stationary mount, a torque insert coupled to the at least one arm and the stationary mount, and a torsion spring received around a portion of the stationary mount and at least a portion of the torque insert.

2. The cover assembly of claim 1, wherein the at least one arm of the pivotable portion includes two arms and the at least one coupling assembly includes two coupling assemblies, each of the two arms including one of the two coupling assemblies.

3. The cover assembly of claim 1, wherein a first end of the torque insert is received within an opening in the at least one arm and a second end of the torque insert is received within an opening in the stationary mount.

4. The cover assembly of claim 1, wherein the at least one arm includes an opening configured to receive a portion of the torsion spring.

5. The cover assembly of claim 4, wherein the at least one arm includes a second opening configured to receive a portion of the torque insert.

6. The cover assembly of claim 1, wherein the stationary mount includes a plate configured to be coupled to the stationary portion and an extension extending from the plate, the extension including an opening configured to receive an end of the torque insert.

7. The cover assembly of claim 1, wherein the pivotable portion is configured to be held at a plurality of positions between a fully open position and a fully closed position.

8. The cover assembly of claim 6, wherein the torsion spring is received around the extension.

9. The cover assembly of claim 1, wherein the pivotable portion is transitionable between an open position and a closed position, and when in the closed position, the stationary portion and the pivotable portion extend along a single longitudinal plane.

10. A vehicle, comprising:
a frame;
front and rear ground engaging members supporting the frame;
a powertrain drivingly coupled to at least one of the front and rear ground engaging members;
a seating area supported by the frame;
a cargo area having a body supported by the frame and positioned longitudinally rearward of the seating area, the body positioned within a portion of the frame; and
a cover assembly received on a portion of the body of the cargo area and configured to cover an opening in the cargo area, the cover assembly coupled to the cargo area through at least one latch, wherein at least one mount for the at least one latch is integral with the body of the cargo area.

11. The vehicle of claim 10, wherein the cover assembly includes a stationary portion fixedly coupled to the cargo area and a pivotable portion pivotably coupled to the stationary portion at a first end, a second end of the pivotable portion being coupled to the cargo area via the at least one latch.

12. The vehicle of claim 11, wherein the cover assembly further includes at least one coupling assembly, the at least one coupling assembly including a torque insert and a torsion spring.

13. The vehicle of claim 10, wherein the mount for the at least one latch is adjacent the opening in the cargo area.

14. The vehicle of claim 10, wherein the at least one latch includes a first latch and a second latch and the at least one mount includes a first mount and a second mount, the first latch being coupled to the first mount and the second latch being coupled to the second mount.

15. The vehicle of claim 12, wherein the pivotable portion includes at least one arm and the at least one coupling assembly couples the at least one arm of the pivotable portion to the stationary portion.

16. The vehicle of claim 15, wherein the at least one coupling assembly further includes a stationary mount, wherein the torque insert is coupled to the at least one arm and the stationary mount, and the torsion spring is received around a portion of the stationary mount and at least a portion of the torque insert.

17. The vehicle of claim 16, wherein the stationary mount includes a plate configured to be coupled to the stationary portion and an extension extending from the plate, the extension including an opening configured to receive an end of the torque insert.

18. The vehicle of claim 16, wherein a first end of the torque insert is received within an opening in the at least one arm and a second end of the torque insert is received within an opening in the stationary mount.

19. The vehicle of claim 18, wherein the at least one arm includes a first opening configured to receive a portion of the torsion spring and a second opening configured to receive a portion of the torque insert.

20. The vehicle of claim 10, wherein the body defines a bottom surface and a plurality of upstanding walls projecting upwardly from the bottom surface, the plurality of upstanding walls defining an upper extent, wherein the cover assembly is configured to cover the upper extent.

21. The vehicle of claim 10, wherein the cover assembly is transitionable between an open position and a closed position, wherein the at least one latch is received by the at least one mount in the closed position.

22. The vehicle of claim 12, wherein the pivotable portion is transitionable between an open position and a closed position, and the combination of the torque insert and the torsion spring allows the pivotable portion to be held at a position between the closed position and the open position.

23. A vehicle, comprising:
a frame;
front and rear ground engaging members supporting the frame;
a powertrain drivingly coupled to at least one of the front and rear ground engaging members;
a seating area supported by the frame;
a cargo area supported by the frame and positioned longitudinally rearward of the seating area; and
a cover assembly configured to cover an opening in the cargo area, the cover assembly including,
a stationary portion coupled to the cargo area adjacent the opening;
a pivotable portion including at least one arm; and
at least one coupling assembly coupling the at least one arm of the pivotable portion to the stationary portion, the at least one coupling assembly including a stationary mount, a torque insert coupled to the at least one arm and the stationary mount, and a torsion spring received around a portion of the stationary mount and at least a portion of the torque insert.

24. The vehicle of claim 23, wherein the at least one latch is removably coupled to a mounting recess and the mounting recess is formed with the cargo area.

* * * * *